United States Patent
Auernhammer et al.

(10) Patent No.: US 11,645,215 B2
(45) Date of Patent: May 9, 2023

(54) EFFICIENT SELECTION OF A PARTICULAR PROCESSOR THREAD FOR HANDLING AN INTERRUPT

(71) Applicant: INTERNATIONAL BUSINESS MACHINES CORPORATION, Armonk, NY (US)

(72) Inventors: Florian Auernhammer, Rueschlikon (CH); Wayne Melvin Barrett, Rochester, MN (US); David A. Shedivy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 17/345,865

(22) Filed: Jun. 11, 2021

(65) Prior Publication Data

US 2022/0398204 A1 Dec. 15, 2022

(51) Int. Cl.
  *G06F 13/24* (2006.01)
  *G06F 9/48* (2006.01)
(52) U.S. Cl.
  CPC ............ *G06F 13/24* (2013.01); *G06F 9/4831* (2013.01)
(58) Field of Classification Search
  CPC ................................ G06F 13/24; G06F 9/4831
  See application file for complete search history.

(56) References Cited

U.S. PATENT DOCUMENTS

| | | | |
|---|---|---|---|
| 4,350,058 A * | 9/1982 | Miller | F16H 61/0437 477/154 |
| 8,972,642 B2 | 3/2015 | Venkumahanti et al. | |
| 9,116,869 B2 | 8/2015 | Madukkarumukumana et al. | |
| 10,545,892 B2 | 1/2020 | Adachi et al. | |
| 10,579,416 B2 | 3/2020 | Jaloma et al. | |
| 10,614,006 B2 | 4/2020 | Bshara et al. | |
| 10,996,990 B2 | 5/2021 | Makineedi et al. | |
| 2003/0133464 A1 * | 7/2003 | Marejka | H04L 49/901 370/428 |

(Continued)

OTHER PUBLICATIONS

Horst et al.; "Quantifying the Latency and Possible Throughput of External Interrupts on Cyber-Physical Systems", CPS-IoTBench'20, 3rd Workshop on, pp. 1-7,Sep. 25, 2020.

(Continued)

*Primary Examiner* — Henry Tsai
*Assistant Examiner* — Kim T Huynh
(74) *Attorney, Agent, or Firm* — Brian F. Russell; Nathan Rau

(57) ABSTRACT

A plurality of virtual processor threads are executed on the plurality of physical processor threads. In a data structure, information pertaining to a plurality of interrupt sources in the data processing system is maintained. The information includes a historical scope of transmission of interrupt commands for an interrupt source. Based on an interrupt request from an interrupt source, an interrupt master transmits a first interrupt bus command on an interconnect fabric of the data processing system to poll one or more interrupt snoopers regarding availability of one or more of the virtual processor threads to service an interrupt. The interrupt master updates the scope of transmission specified in the data structure based on a combined response to the first interrupt bus command. The interrupt master applies the scope of transmission specified in the data structure to a subsequent second interrupt bus command for the interrupt source.

20 Claims, 16 Drawing Sheets

(56) References Cited

U.S. PATENT DOCUMENTS

| | | | |
|---|---|---|---|
| 2010/0082867 A1* | 4/2010 | Adachi | G06F 13/24 |
| | | | 710/261 |
| 2014/0108691 A1* | 4/2014 | Kennedy | G06F 9/4812 |
| | | | 710/269 |
| 2018/0285293 A1 | 10/2018 | Dykema et al. | |
| 2019/0087222 A1 | 3/2019 | Bhandari et al. | |
| 2019/0138472 A1 | 5/2019 | Dusanapudi et al. | |
| 2019/0340155 A1* | 11/2019 | Brewer | G06F 9/542 |
| 2019/0370198 A1 | 12/2019 | Arndt et al. | |
| 2020/0125395 A1 | 4/2020 | Accapadi et al. | |
| 2021/0072995 A1 | 3/2021 | Kallam et al. | |

OTHER PUBLICATIONS

Feng et al.; "Certifying Low-Level Programs With Hardware Interrupts and Preemptive Threads", ACM SIGPLAN Notices, vol. 43, No. 6, pp. 1-16, Jun. 2008.

Ahmad et al.; "vIC: Interrupt Coalescing for Virtual Machine Storage Device IO", USENIXATC'11 USENIX Annual Technical Coference on, pp. 1-14, Jun. 2011.

Lee et al.; "Interrupt Handler Migration and . . . of Interrupt-Driven Tasks", ACM Transactions on Embedded Computing Systems, vol. 9, No. 4, Article 42, pp. 1-34, Mar. 2010.

Regehr et al.; "Interrupt Verification via Thread Verification", Electronic Notes in Theoretical Computer Science, vol. 174, Issue 9, pp. 139-150, Jun. 22, 2007.

\* cited by examiner

| Rep. Addr. | Valid | VP # | Process ID | Operating Priority | IAC | Escalate Event No. | Assigned | Event Path No. | Event Priority | Preferred | Age |
|---|---|---|---|---|---|---|---|---|---|---|---|
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |

222

EFFICIENT SELECTION OF A PARTICULAR PROCESSOR THREAD FOR HANDLING AN INTERRUPT

BACKGROUND OF THE INVENTION

One or more embodiments of the inventions relate generally to data processing systems and, more particularly, to efficient selection of a particular virtual processor thread for handling an interrupt from among multiple virtual processor threads executing on cores of one or more processing nodes.

In data processing systems, an interrupt signal, also referred to as an interrupt, is generated to indicate to a processor core that an event requires attention. Interrupt handling in processors is generally a time-consuming process that requires locating a processor thread available to handle an interrupt. Depending on a priority of an interrupt, a processor may respond to an interrupt by suspending current activities, saving state, and then executing a function to service the event, before resuming suspended activities.

BRIEF SUMMARY

In at least one embodiment, a data processing system includes a plurality of processor cores having a plurality of physical processor threads. A plurality of virtual processor threads are executed on the plurality of physical processor threads. In a data structure, information pertaining to a plurality of interrupt sources in the data processing system is maintained. The information includes a historical scope of transmission of interrupt commands for an interrupt source. Based on an interrupt request from an interrupt source, an interrupt master transmits a first interrupt bus command on an interconnect fabric of the data processing system to poll one or more interrupt snoopers regarding availability of one or more of the virtual processor threads to service an interrupt. The interrupt master updates the scope of transmission specified in the data structure based on a combined response to the first interrupt bus command. The interrupt master applies the scope of transmission specified in the data structure to a subsequent second interrupt bus command for the interrupt source.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
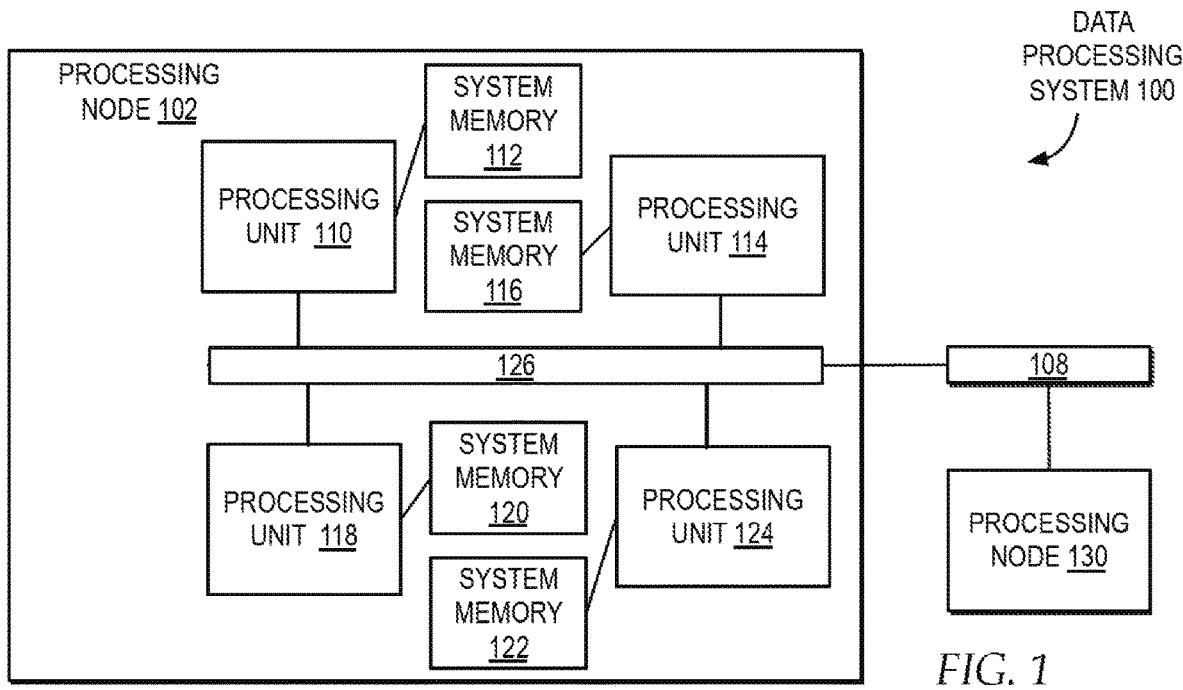
FIG. 1 is a high-level block diagram of an exemplary data processing system that assigns interrupts to threads in accordance with one embodiment.

With reference now to the figures and, in particular, with reference to FIG. 1, there is illustrated a block diagram of one example of a data processing system 100 in which interrupts are managed through a bus protocol that determines the capability and availability of multiple virtual processor (VP) threads to handle an interrupt by issuing a sequence of one or more single bus commands and that assigns the interrupt to a single VP thread for service.

Data processing system 100 is a cache-coherent symmetric multiprocessor (SMP) including multiple processing nodes for processing data and instructions, such as a processing node 102, a processing node 130, and possibly additional processing nodes. In one example, processing node 102 and processing node 130 are coupled to a system interconnect 108 for conveying address, data and control information between a processing nodes and other resources outside a processing node, such as cache, memory, and input/output (I/O) interfaces. System interconnect 108 may be implemented with one or more buses and switches and may represent, for example, a bused interconnect, a switched interconnect, or a hybrid interconnect.

In one example, each processing node 102, 130 may represent a multi-chip module (MCM) including multiple processing units, such as processing units 110, 114, 118, and 124. Each of the processing units in a processing node may be communicatively coupled for conveying address, data, and control information with each other and system interconnect 108 by a local interconnect 126, which may be implemented through one or more buses and switches. In one example, the combination of system interconnect 108 and a local interconnect of each processing node, such as local interconnect 126 of processing node 102, may form a system fabric. In additional or alternate embodiments, data processing system 100 may include additional or alternate processing nodes and additional or alternate layers of system interconnects and local interconnects.

In one example, each processing node of data processing system 100, such as processing node 102 and processing node 130, may include one or more memory controllers 212 (see FIG. 2) to provide an interface for controlling system memory, such as system memories 112, 116, 120, and 122. In one example, data and instructions residing in system memories 112, 116, 120, and 122 may be accessed, cached, and modified by any processor core in any processing unit of any processing node within data processing system 100. In one example, system memories 112, 116, 120, and 122 may represent a lowest level of memory storage in a distributed shared memory system of data processing system 100. In other examples, additional or alternate MCs may be coupled directly to local interconnect 126 or system interconnect 108. In additional or alternate examples, each of processing node 102 and processing node 130 may include additional or alternate memory layers (e.g., cache memories in cores 210). In additional or alternate examples, data processing system 100 may include additional or alternate memory systems and subsystems connected via system interconnect 108 or may connect to memory systems and subsystems external to data processing system 100.

In one or more embodiments, the system fabric of data processing system 100 supports a multiplicity of chronologically overlapping commands of possibly differing scopes (extents) of transmission. For example, a command (including each of the interrupt bus protocol commands discussed below) may be sent to all the processing units in all processing nodes of data processing system 100 (a "system" scope), to a group of multiple but less than all processing units (a "group" scope), which may include, for example, all processing units in the same processing node, or to a single processing unit chip (e.g., a "chip" scope) through a scope setting in the command and/or a configuration in the system fabric. In one example, a command may be initially transmitted with a more limited scope, such as a chip scope or group scope, and if unsuccessful, re-transmitted with a greater scope, such as a group scope or a system scope. Further, the initial (e.g., default) scope of transmission for a command may be varied based on historical information regarding the success and/or failure of prior commands in completing successfully. For example, a first interrupt command may be initially transmitted with a more limited scope, such as a chip scope or group scope, and if unsuccessful, a subsequent second interrupt command (which may differ in type from the first interrupt command) may be initially transmitted with a greater scope, such as a group scope or a system scope.

Those of ordinary skill in the art will appreciate that data processing system 100 of FIG. 1 may include additional or alternate components, including, but not limited to, additional processing units, additional system memory, interconnect bridges, non-volatile storage, power controllers, and ports for connection to networks or input/output devices. Those of ordinary skill in the art will appreciate that invention described herein is applicable to data processing systems of diverse architectures and is in no way limited to the generalized data processing system architecture illustrated in FIG. 1.

Figure 2A:
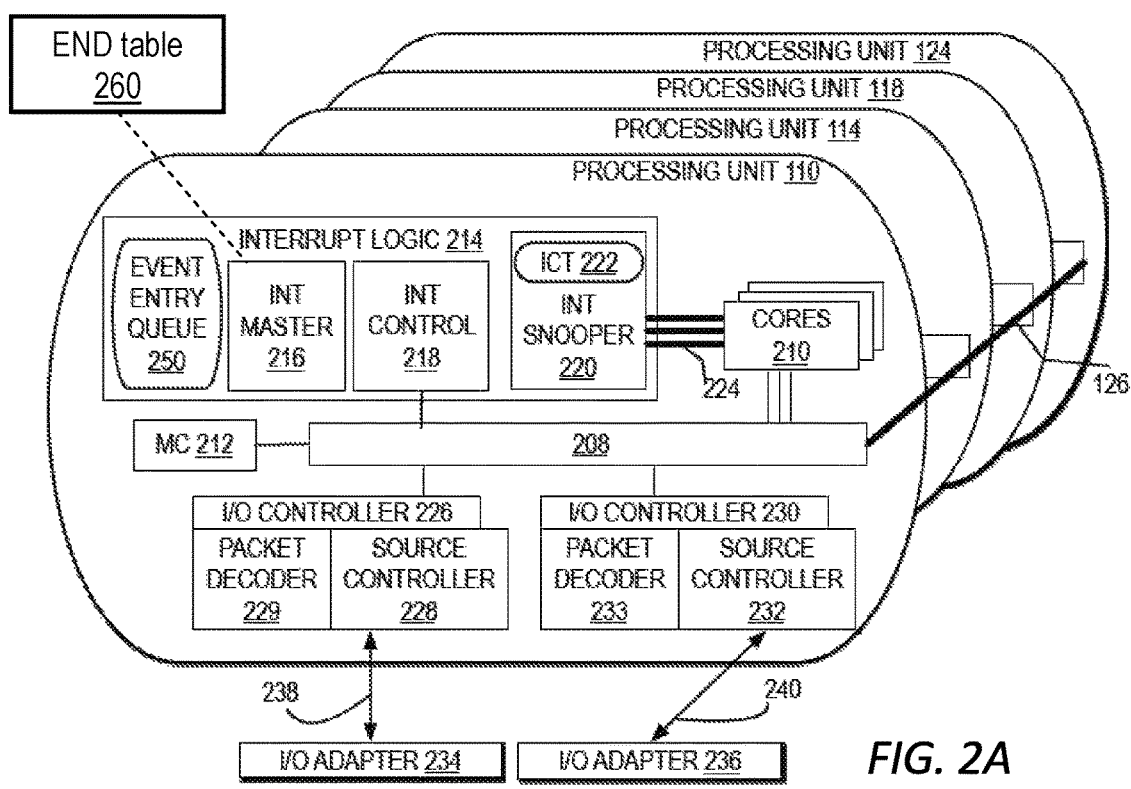
FIG. 2A is a high-level block diagram of an exemplary embodiment of a processing unit in the data processing system of FIG. 1.

Referring now to FIG. 2A, there is depicted a block diagram of an exemplary processing unit in accordance with at least one embodiment. In the depicted example, each of processing units 110, 114, 118, and 124 may be implemented as a respective integrated circuit chip including one or more processor cores 210 for processing instructions and data. In at least some embodiments, each processor core 210 supports simultaneous multithreading (SMT) and is therefore capable of simultaneously executing a plurality of physical processor (PP) threads (also referred to as hardware threads). In a preferred embodiment, which will hereafter be assumed, these PP threads are virtualized, and each PP can execute one or more virtual processor (VP) threads each representing an ordered sequence of instructions.

In some embodiments and/or execution scenarios, the ordered sequence of instructions executed as a VP thread may include instructions for handling hardware-generated and/or software-generated interrupts, as discussed further below. In one example, a hardware interrupt may be generated by one or more hardware components within or connected to data processing system 100 including, but not limited to, a core 210 and an input/output device. In one example, a software interrupt may be triggered by one or more software components, such as, but not limited to, an exception condition in a processor or a special instruction in an instruction set architecture (ISA) that, when executed, causes an interrupt to be generated.

Interrupts triggered within data processing system 100 may have an assigned priority. Depending on the priority of an interrupt, a core 210 may respond to an interrupt by one or more of suspending a VP thread, saving the state (context) of a VP thread, and executing an interrupt handler to service the event that triggered the interrupt. Following the serving of the interrupt, a core 210 may resume a suspended VP thread.

In the depicted embodiment, each core 210 is communicatively coupled to a unit interconnect 208, which may comprise one or more layers of buses and switches, including, but not limited to memory buses, I/O buses, and/or node buses. As shown, the unit interconnects 208 of various processing units may be coupled together through a local interconnect 126. Unit interconnect 208 may be communicatively coupled to other hardware units of processing unit 110, including a memory controller 212 of a system memory 112, 116, 120, or 122, one or more I/O controllers 226, 230, and interrupt logic 214.

In the illustrated example, each of I/O controllers 226, 230 is coupled, via a respective I/O bus 238, 240, to a respective one of I/O adapters 234, 236, which generates or detects events that can cause an interrupt to be triggered and communicates such events to the associated one of I/O controllers 226, 230. Each I/O controller includes a respective packet decoder 229, 233 and a respective interrupt source controller (ISC) 228, 232. In one example, each ISC 228, 232 may include a respective event assignment table (EAT) in which values may be set via software, such as a hypervisor. The values configured in each EAT can be utilized by the associated ISC 228 or 232 to create event routing messages, which I/O controller 226 or 230 transmits on unit interconnect 208 to interrupt logic 214.

In the depicted embodiment, interrupt logic 214 includes at least one interrupt (INT) master 216 (also referred to as an interrupt routing controller (IRC)), INT control 218, at least one INT snooper 220 (also referred to as an interrupt presentation controller (IPC)), and an event entry queue 250. INT master 216 is configured to create event notification messages (ENMs) that can be sent via unit interconnect 208 to one or more INT snooper 220 (in the same of different processing unit chip) to trigger an interrupt. For example, INT master 216 may receive interrupt requests from ISC 228, 232 and/or cores 210. The interrupt requests may include coalesced interrupt requests and/or uncoalesced interrupt requests. For example, ISC 228, coupled to a PCIe bus, may send coalesced interrupt requests to INT master 216 via unit interconnect 208, while ISC 232 and cores 210 may send uncoalesced interrupt requests to INT master 216 via unit interconnect 208.

In response to receiving an interrupt request from an ISC 228, 232, INT master 216 may process the ENM per an in event notification descriptor (END) 261 for the specific interrupt source in END table 260. In one exemplary embodiment depicted in FIG. 2C, each END 261 is uniquely associated with an interrupt source in the processing unit and includes one or more fields, including without limitation, a target scope field 262 indicating a scope of transmission of interrupt commands for the interrupt source (e.g., system, group, or chip), a target spread field 264 indicating whether or not all known possible target VP threads for servicing interrupts triggered by the interrupt source are confined to a single chip, and a backlog count field 266 indicating a backlog of unserved interrupts from the associated interrupt source. The processing of the ENM by INT master 216 may include, but is not limited to, updating event entry queue 250 with the ENM and triggering an interrupt bus protocol to determine the capability and availability of VP threads on one or more processing units of data processing system 100 to handle the interrupt and to select one of the available and capable VP threads to handle the interrupt. In addition, INT master 216 may handle additional functions for managing state changes of assigned processors or handling escalation of an ENM if no VP thread is currently capable of handling the interrupt.

In the depicted example, each INT snooper 220 includes at least one interrupt context table (ICT) 222, which maintains context information for VP threads running on the PP threads of cores 210 of the processing unit containing that INT snooper 220. The information recorded in ICT 222 may include, but need not be limited to, information indicating the capability and availability of each local VP thread running on the local cores 210. In this example, each row in ICT 222 corresponds to a PP thread of one of local cores 210 and provides information relevant to a single respective local VP thread currently running on that PP thread.

Figure 2B:
FIG. 2B is a block diagram of an exemplary interrupt context table (ICT) of an interrupt snooper in the processing unit of FIG. 2A.
Figure 2C:
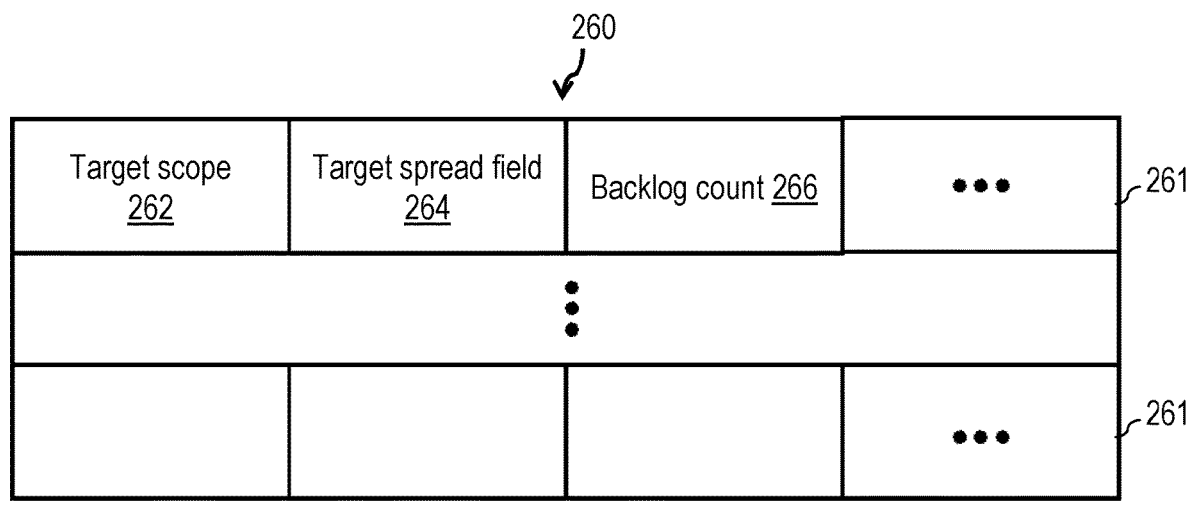
FIG. 2C is a block diagram of an exemplary event notification descriptor (END) table of an interrupt snooper in the processing unit of FIG. 2A.

FIG. 2B provides one example of a format for ICT 222. In this example, each row of ICT 222, which corresponds to a respective one of the local PP threads, includes an Reporting Address field, Valid field, VP thread number (VP #) field, Process ID field (e.g., used for user-level interrupts), an Operating Priority field, an Interrupt Acknowledge Count (IAC) field, an Escalate Event Number field, an Assigned field, an Event Path Number field, an Event Priority field, a Preferred field, and an Age field. A value in the Reporting Address field provides a real memory address (or a portion of a real memory address) where information of an associated row is to be stored in the event an interrupt is preempted. The Valid field indicates whether a processor is installed and powered on and whether a VP is dispatched and operating on the associated PP thread. The VP # field specifies an identifier of the VP thread that is currently dispatched on the associated PP thread. The Process ID field specifies a process ID for a user-level interrupt. The Operating Priority field specifies a priority level of a program currently running on the associated PP thread. The IAC field specifies a current IAC that is used to determine whether an associated VP thread has been interrupted too often. In one or more embodiments, the IAC is decremented when the associated VP thread is interrupted and may be periodically incremented while the associated VP thread is dispatched to implement a rate instrument. The Escalate Event Number field (which may, for example, be configured by OS or hypervisor software) specifies an event source number that is used to escalate an interrupt to a higher software level when a VP thread associated with a current software stack level is interrupted too frequently. It should be appreciated that additional similar VP threads may also be dispatched to service a workload when a given VP thread is interrupted too frequently. The Preferred field may be utilized by software to indicate a preferred VP thread to interrupt. The capability of each VP thread to service an interrupt may be indicated by the Age field, which indicates an age metric for a VP thread. In one example, Age field is implemented as a saturating counter that is advanced (e.g., incremented) each time another VP thread running in data processing system 100 services an interrupt that could have alternatively been serviced by the associated VP thread and is reset to an initial value (e.g., x'00') when the associated VP thread is assigned to service an interrupt. It should be appreciated that Age field need not be precise in that failure to update Age field will not lead to any error condition.

In additional or alternate examples, INT snooper 220 may maintain a respective ICT for each software stack level that is dispatched on a PP thread. For example, a first ICT may be implemented for a hypervisor (Hyp) stack level, a second ICT may be implemented for an operating system (OS) stack level, and a third ICT may be implemented for a user stack level. In additional or alternate embodiments, additional or alternate numbers and types of stack levels may be implemented.

Referring again to FIG. 2A, INT snooper 220 is coupled to each of cores 210 via one or more exception lines 224. In one example, exception lines 224 are used to notify each core 210 of an associated interrupt for an assigned VP thread. In one example, exception lines 224 may include different exception lines implemented for each software stack level. In particular, a separate set of lines within exception lines 224 may be connected to each individual PP thread of a core and multiple wires may be implemented for each PP thread, where each of the multiple wires is implemented for a different software stack level. In one example, exception lines 224 may include separate sets of three lines for each PP thread available from cores 210, where a first exception line generates hypervisor interrupts, a second exception line generates OS interrupts, and a third exception line generates an Event Based Branch. In one example, interrupt logic 214 combines multiple interrupt sources onto multiple exception lines 224 and facilitates the assignment of priority levels to different interrupts. In one example, a separate VP thread number may be associated with each of exception lines 224. In additional or alternate embodiments, exception lines 224 may include additional or alternate numbers, configurations, and specifications of sets of lines for each VP thread and/or PP thread.

In one example, INT control 218 may function as a bus interface controller between interrupt logic 214 and the rest of processing unit 110. In one example, INT control 218 may manage sequencing of interrupt bus protocol commands when interrupt logic 214 drives or receives commands. In one example, INT control 218 may perform compare functions to determine if interrupt logic 214 is the destination of a command, such as a memory-mapped I/O (MMIO) store command used as an interrupt trigger.

According to one or more embodiments of the present invention, interrupts are managed through an interrupt bus protocol that implements a sequence of one or more single bus commands for determining the capability and availability of multiple VP threads across multiple processing nodes to handle the interrupt, and if any of the VP threads are capable and available, for assigning a single VP thread to handle an interrupt. In one example, the single bus commands supported by the bus protocol may include, but are not limited to, interrupt histogram, interrupt poll, interrupt assign, interrupt broadcast, and interrupt directed poll commands. In one example, the particular sequence of the single bus commands issued for a particular interrupt is determined by an INT master 216 in one of processing units 110, 114, 118, 124, but each of the other processing units, if any, that receives the sequence of single bus commands executes each bus command to completion independently of each other processing unit. Managing the determination of the capability and availability of multiple VP threads through a sequence of one or more single bus commands minimizes the overall time required for interrupt handling. Because interrupt handling may include one or more processors responding to the interrupt by suspending a VP thread, saving VP thread state, and executing a function, as the number of processing cores, processing units, and processing nodes connected on a system fabric increases, there is a need to minimize the time required to determine the capability and availability of VP threads to handle an interrupt and to select the VP thread to handle the interrupt in order to minimize the performance impact of interrupt handling on data processing system 100.

Figure 3:
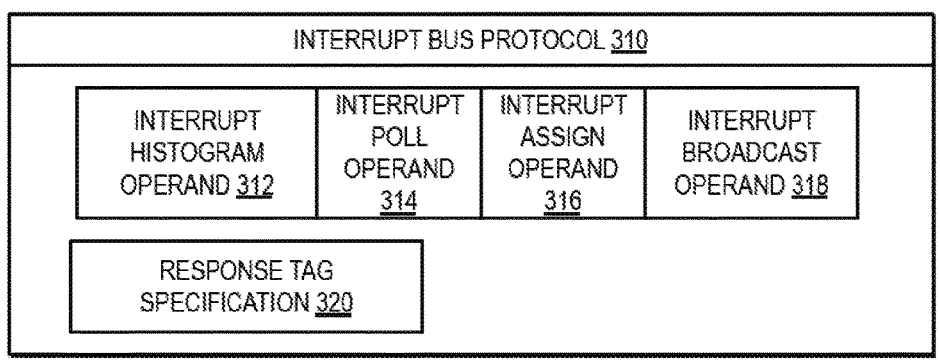
FIG. 3 is a block diagram of exemplary interrupt bus protocol commands for efficiently determining the capabilities and availability of multiple virtual processor (VP) threads across multiple processing units and for selecting a particular VP thread to handle an interrupt in accordance with one embodiment.

With reference now to FIG. 3, there is illustrated a block diagram of one example of a set of interrupt bus protocol commands utilized by interrupt logic 214 to efficiently determine the capability and availability of VP threads to service an interrupt and to select a particular VP thread to handle the interrupt. Commands belonging to interrupt bus protocol 310 can be communicated via the system fabric and unit interconnects 208 as previously described.

In the illustrated example, interrupt bus protocol 310 includes one or more types of protocol functions and operands for interrupt management including, but not limited to interrupt histogram operand 312, interrupt poll operand 314, interrupt assign operand 316, and interrupt broadcast operand 318. In one example, interrupt histogram operand 312, interrupt poll operand 314, interrupt assign operand 316, and interrupt broadcast operand 318 may each support specifications for using a single bus command to concurrently communicate with multiple processing units within data processing system 100. In one example, interrupt bus protocol 310 may include a scope element that specifies the scope of each single bus command within data processing system, including whether each single bus command is issued to all or only a subset of processing units within data processing system 100.

In addition, interrupt bus protocol 310 may implement one or more types of response specifications, such as a response tag specification 320. In one example, response tag specification 320 may include a specification for each INT snooper 220 within the scope to provide its respective individual partial response to an interrupt bus protocol command received from an INT master 216. In one example, response tag specification 320 may include multiple bits with a first selection of bits selectable as a poll vector with each bit assigned an age bucket or index to a snooper ID, at least one bit for specifying preclusion, at least one bit for specifying collision, and optionally one or more additional bits. Response tag specification 320 may also include a specification for combining the partial responses to obtain a combined response for an interrupt command and distributing the combined response.

Figure 4:
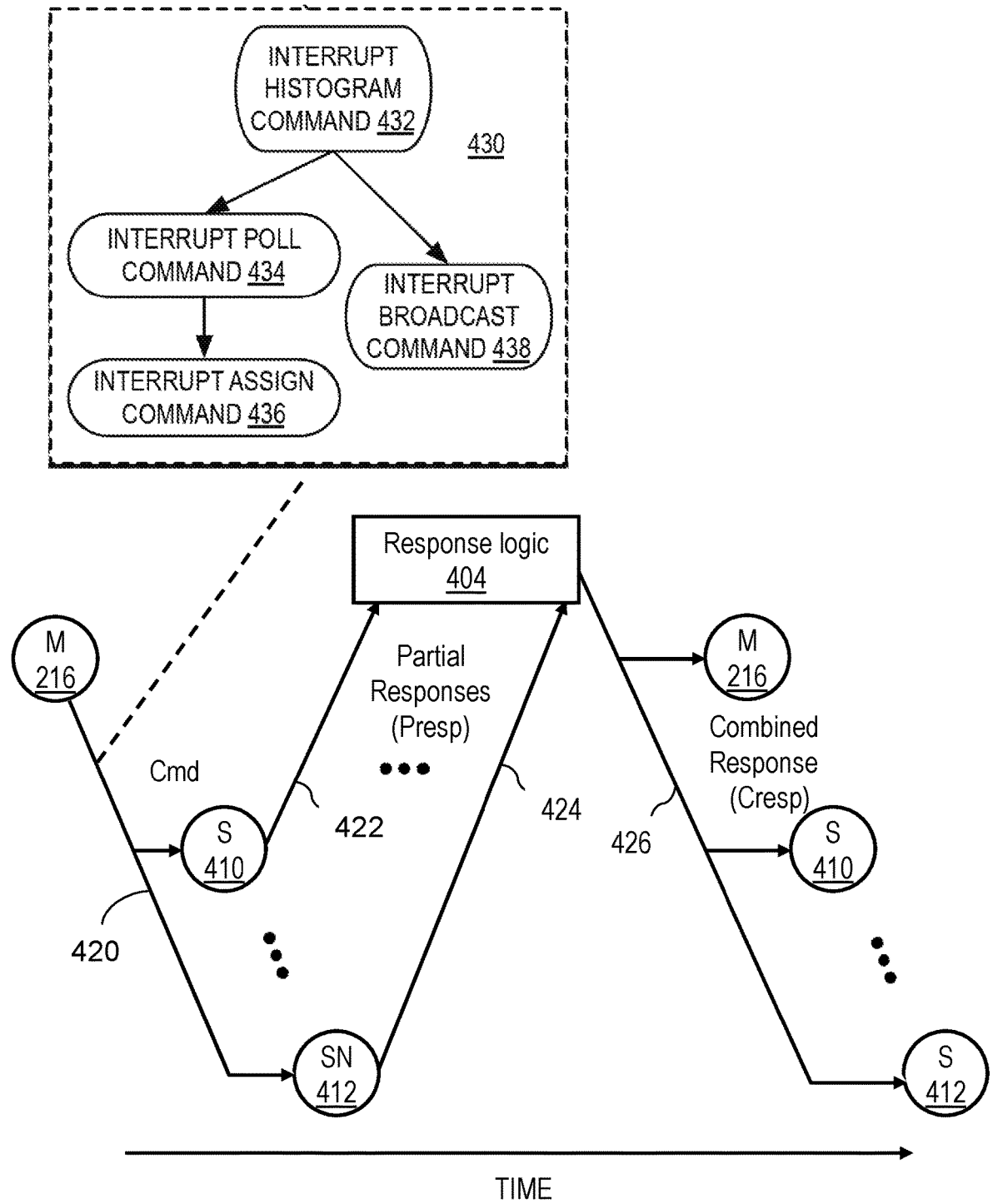
FIG. 4 is a time-space diagram of one example of a flow of an interrupt bus protocol command and associated responses to and from instances of interrupt logic distributed across multiple processing units of data processing system in accordance with one embodiment.

Referring now to FIG. 4, there is depicted a time-space diagram of one example of a flow of commands and responses to and from instances of interrupt logic 214 distributed across multiple processing units, where each instance of interrupt logic 214 independently monitors capability and availability of multiple separate VP threads on multiple cores 210. In the illustrated example, an INT master 216 in a processing unit within data processing system 100 issues an interrupt bus protocol command 420 supported by specifications in interrupt bus protocol 310 to efficiently identify and select a VP thread to handle an interrupt. Interrupt bus protocol command 420 is distributed via unit interconnect 208 and possibly the system fabric to each INT snooper 220 within the specified scope of interrupt bus protocol command 420, which in this example, include an INT snooper 410 and an INT snooper 412. INT snooper 410 and INT snooper 412 may be co-located within a same processing unit as INT master 216 and/or other processing unit(s) different than the one including INT master 402.

Each INT snooper 410, 412 receiving command 420 may respond to a single interrupt bus protocol command 420 with a partial response including a response tag supported by response tag specification 320. For example, INT snooper 410 may respond with a partial response 422, and INT snooper 412 may respond with a partial response 424. In at least some embodiments, partial responses 422, 424 are received at a centralized point, referred to herein as response logic 404, which forms a combined response (Cresp) 426 from all the partial responses 422, 424 received. Response logic 404 then distributes combined response 426, which represents a systemwide response to command 420, to INT master 216 and each responding INT snooper 410, 412. In one example, the system fabric, which supports communications between the processing units via interrupt bus protocol 310, may include response logic 404. In another example, the instance of interrupt logic 214 including INT master 216 may include response logic 404, for example, as part of INT controller 218.

As illustrated at reference numeral 430, INT master 216 may initially issue one type of command in interrupt bus protocol 310 and then follow that command with a different command in interrupt bus protocol 310. For example, INT master 216 may initially issue as command 420 an interrupt histogram command 432. Depending on the combined response 426 to the interrupt histogram command 432, INT master 216 may then issue, as a subsequent interrupt bus protocol command 420, an interrupt poll command 434 or an interrupt broadcast command 438. If INT master 216 issues an interrupt poll command 434, INT master 402 may select whether to issue, as a next interrupt bus protocol command 420, an interrupt assign command 436 based on the combined response 426 of the interrupt poll command 434.

It should be appreciated from FIG. 4 that, depending on system scale and bus utilization, the latency between when an INT snooper 410, 412 receives a command 420 and receives the corresponding combined response 426 may be significant. The present disclosure therefore recognizes that it would be useful and desirable for a given INT snooper 410 or 412 to be able to initiate processing of an interrupt prior to receipt of combined response 426 based on receipt of command 420, as described in greater detail below, for example, with reference to FIG. 13.

Figure 5:
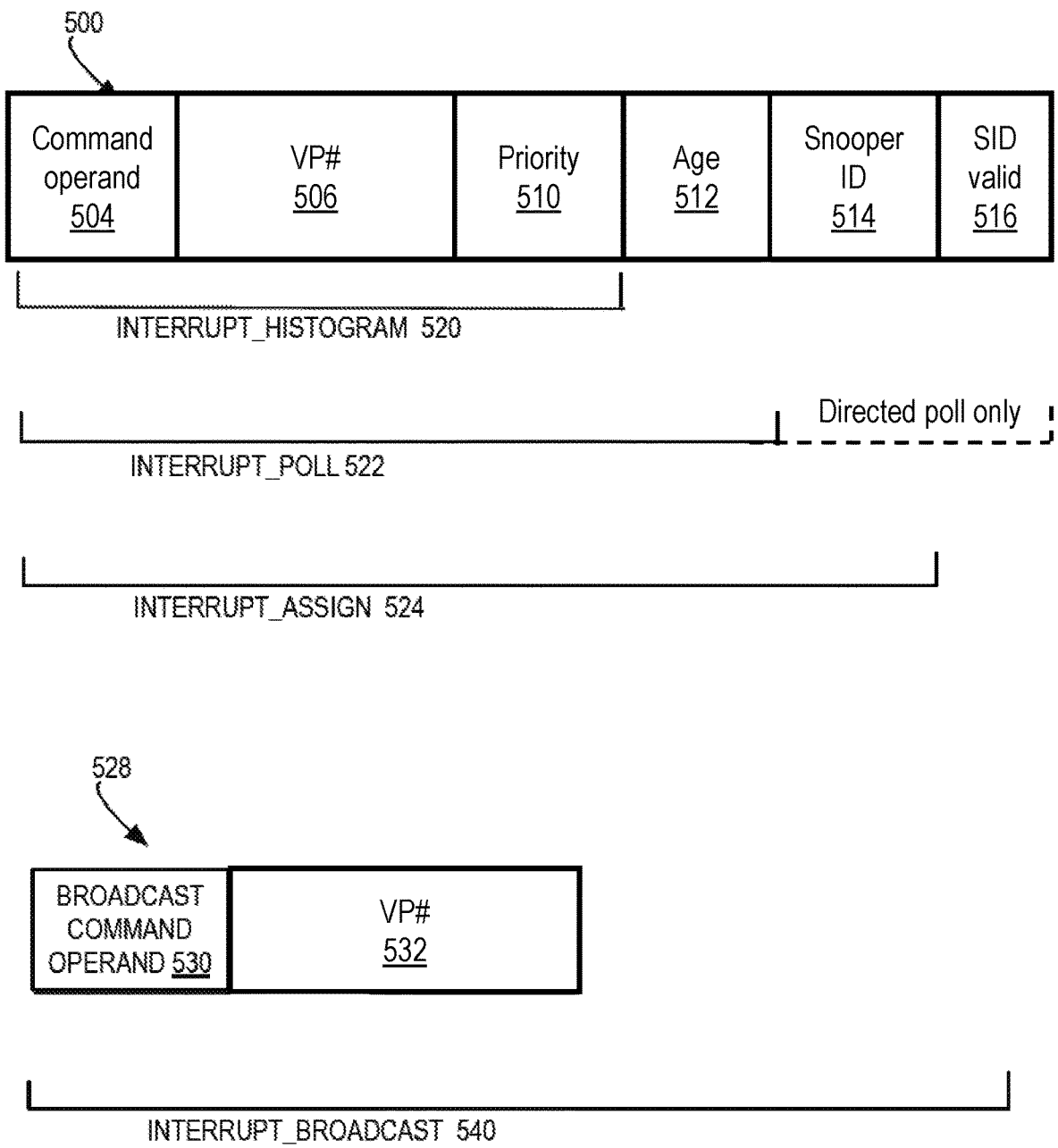
FIG. 5 is a block diagram of one example of operand field specifications for each of the interrupt histogram, interrupt poll, and interrupt assign commands in an interrupt bus protocol in accordance with one embodiment.

With reference now to FIG. 5, there is illustrated a block diagram of one example of operand field specifications for each of the interrupt histogram, interrupt poll, and interrupt assign commands in interrupt bus protocol 310. As illustrated, bus protocol specification 500 may include a bit fields that are employed in various ones of the interrupt histogram, interrupt poll, and interrupt assign commands. For example, the bit fields included in bus protocol specification 500 may include a command operand field 504, VP # field 506, priority field 510, age field 512, snooper identifier (ID) field 514, and snooper ID (SID) valid field 516. In various embodiments, bus protocol specification 500 may include additional or alternate fields.

In the illustrated example, an interrupt histogram operand specification 520, supported by interrupt histogram operand 312, may include bit settings for specifying an interrupt histogram command in command operand field 504, for specifying one or a group of VP threads in VP # field 506, and for specifying an interrupt priority in priority field 510. Interrupt histogram operand specification 520 may define a call to INT snoopers 220 on one or more processing units to return a capability to handle a particular type of interrupt operation.

In the illustrated example, an interrupt_poll operand specification 522 may include bit settings for specifying an interrupt poll command in command operand field 504, for specifying one or a group of VP threads in VP # field 506, for specifying an interrupt priority in priority field 510, for specifying a VP thread age in age field 512, for specifying a snooper identifier (ID) in snooper ID (SID) field 514, and for indicating whether the content of SID field 514 is valid in SID valid field 516. In one example, interrupt_poll operand specification 522 may define a call to the INT snoopers 220 on one or more processing units to return an availability to handle an interrupt operation based on a priority setting and age setting. In one embodiment, SID field 514 and SID valid field 516 are only employed for interrupt directed poll commands, which are directed to a single target VP thread.

In the illustrated example, interrupt assign operand specification 524 may include bit settings for specifying an assign command in command operation 504, for VP # field 506, for priority field 510, age field 512, and snooper ID field 514. In the example, snooper ID 514 may designate a particular INT snooper 220 as assigned to handle an interrupt from among multiple INT snoopers 220 responding to a prior interrupt poll command 434.

As further shown in FIG. 5, a bus protocol specification 528 may include a specification for an interrupt broadcast command 540. In the depicted example, bus protocol specification 528 includes bits settings for specifying an interrupt broadcast command in broadcast command operand field 530 and for a VP # field 532. In another example, bus protocol specification 528 may be incorporated into bus protocol specification 500 through one or more alternative settings, such as, but not limited to, using command operand field 504 to specify an interrupt broadcast command.

Figure 6:
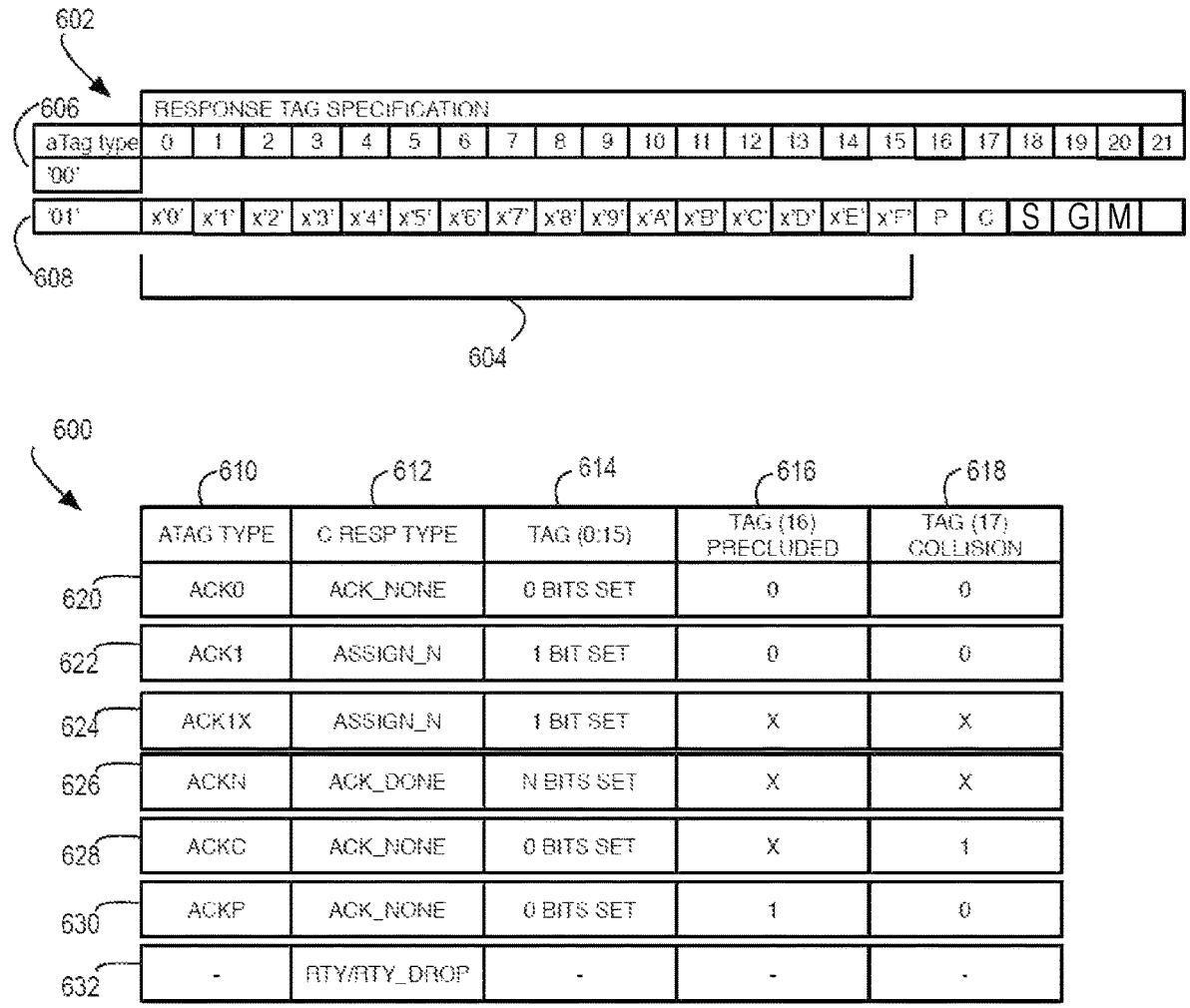
FIG. 6 is a block diagram of one example of a response tag specification for partial responses to each of the interrupt histogram, interrupt poll, interrupt assign, and interrupt broadcast commands and the types of acknowledgements specified by the response tag specification in accordance with one embodiment.

Referring now to FIG. 6, there is depicted an example of a partial response tag specification for response to each of the interrupt histogram, interrupt poll, interrupt assign, and interrupt broadcast commands and the types of acknowledgements specified by the response tag specification in accordance with one embodiment.

As illustrated, a response tag specification 602 may include an acknowledgement tag (aTAG) type of '00' as illustrated at reference numeral 606 or of '01' as illustrated at reference numeral 608. In one example, when an aTAG type of '00' is asserted, no bits in any of the other fields of the response tag contain valid information. In one example, when an aTAG type of '01' is asserted, then the other fields of the response tag may contain valid information. In the example of FIG. 6, bits (0:15) specify a poll vector 604, in which each bit represents an age bucket or an index to the snooper ID of the INT snooper 220 responding to the interrupt command, bits (16:17) respectively indicate a preclude (P) setting and a collision (C) setting, and bits (18:20) provide decoded scope settings, including a system (S) setting, group (G) setting, and master chip (M) setting. In one example, assertion of the P bit indicates that at least one higher priority interrupt is already pending for a VP thread capable of handling a particular interrupt. Assertion of the C bit may indicate that resources, which may be shared across the ICT(s) of an INT snooper 220 to track commands, are fully allocated and an interrupt bus command cannot be handled until a shared resource becomes available. Assertion of the C bit may also indicate detection of a collision in accessing an entry in an ICT. Based on assertion of the C bit, an INT master 216 will generally retry the interrupt bus command until the interrupt bus command is accepted and the C bit is not asserted. The scope settings are asserted by an INT snooper 220 to indicate if an interrupt bus command is to be re-issued or a subsequent interrupt command is to be issued with an change in the scope of transmission.

Each INT snooper 220 may independently execute and respond to each interrupt histogram, interrupt poll, interrupt assign, or interrupt broadcast command in a sequence of bus interrupt commands with a partial response containing a response tag formed based on the response tag specification 602. In one example, response logic 404 may receive and combine the partial responses 422, 424 received from multiple INT snoopers 220 and determine the combined response (Cresp) 426.

Table 600 of FIG. 6 illustrates examples of the aTAGs and combined responses indicated by specific tag settings in response tag specification 602, when multiple response tags returned in accordance with response tag specification 602 are combined to form combined response 426. Column 610 includes one or more aTAG ID types, column 612 includes one or more combined response (Cresp) types, column 614 specifies bit settings for poll vector 604, column 616 specifies a bit setting of the combined precluded (P) bit in response tag specification 602, and column 618 specifies a bit setting of the combined collision (C) bit in response tag specification 602.

As indicated at reference numeral 620, if poll vector 604 includes zero bits set, the P bit is set to '0', and C bit is set to '0', then the aTAG type is "Ack0", and the Cresp type is "Ack_none". As indicated at reference numeral 622, if poll vector 604 includes one bit set, the P bit is set to '0', the C bit is set to '0', then the aTAG type is "Ack1" and the Cresp type is "Assign_N". As indicated at reference numeral 624, if poll vector 604 includes one bit set, then the P bit and C bit are "don't cares" (X), the aTAG type is "Ack1x", and the Cresp type is "Assign_N". As indicated at reference numeral 626, if poll vector includes N bits set and the P and C bits are "don't cares" (X), then the aTAG type is "AckN", and the Cresp type is "Ack_done". As indicated at reference numeral 628, if poll vector 604 includes zero bits set, the P bit is a "don't care" (X), and the C bit is set to '1', then the aTAG type is "AckC", and the Cresp type is "Ack_none". As indicated at reference numeral 630, if poll vector 604 includes zero bits set, the P bit is set to '1', and the C bit is set to '0', then the aTAG type is "AckP", and the Cresp type is "Ack_none". As indicated at reference numeral 632, if the combined response tag is set to an aTAG ID of '00', then the Cresp type is retry/retry drop ("Rty/Rty drop").

With reference now to FIGS. 7A-7F, there is illustrated a high-level logical flowchart of an exemplary process for managing the interrupt histogram, interrupt poll, interrupt assign, interrupt broadcast, and interrupt directed poll bus protocol commands within interrupt logic of each processing node, for efficiently issuing a sequence of one or more single bus commands to identify one or more VP threads capable and available to handle an interrupt, and for selecting one of the one or more identified VP threads to handle the interrupt in accordance with one embodiment.

Figure 7A:
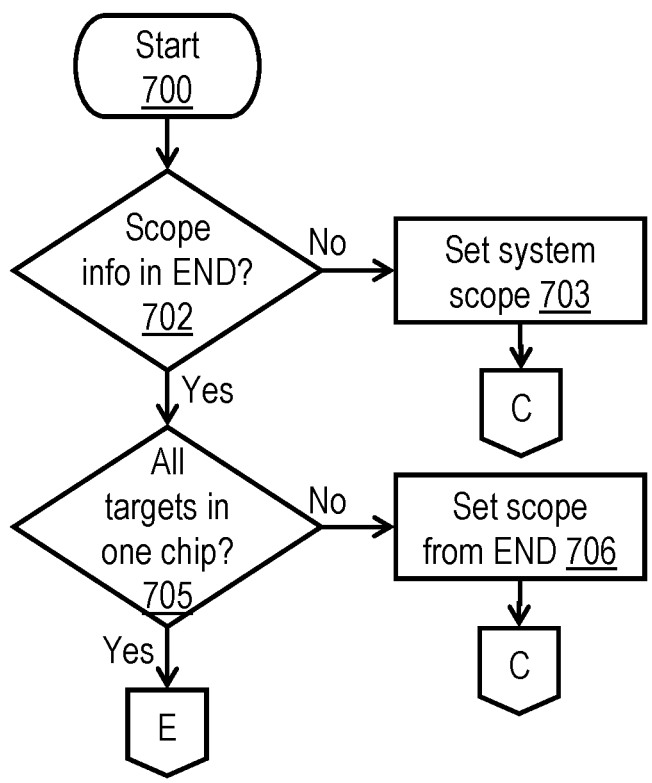
FIGS. 7A-7F together form a high-level logical flowchart of an exemplary process for managing the interrupt histogram, interrupt poll, interrupt assign, interrupt broadcast, and interrupt directed poll bus protocol commands within interrupt logic of each processing node, for efficiently issuing a sequence of one or more single bus commands to identify one or more virtual processor (VP) threads capable and available to handle an interrupt, and for selecting one of the one or more identified VP threads to handle the interrupt in accordance with one embodiment.

With reference now to FIG. 7A, the illustrated process begins at block 700, for example, in based on receipt of an interrupt request from an ISC 228 or 232, and proceeds to block 702, which illustrates INT master 216 determining whether or not it has recorded a target scope for the requested interrupt in target scope field 262 of the relevant END 261 of END table 260. If not, the INT master 216 sets the scope for interrupt bus commands for the interrupt to system scope in target scope field 262 (block 703). The process then passes through page connector C to FIG. 7B, which illustrates INT master 216 performing the interrupt histogram command processing described below in order to locate possible target VP threads. If, however, INT master 216 determines at block 702 that the target scope field 262 of the relevant END 261 already specifies a scope of transmission that has been utilized to communicate interrupt bus commands with potential target VPs for the interrupt, the process proceeds from block 702 to block 705, which illustrates INT master 216 determining whether or not the target spread field 264 of the relevant END 261 already specifies a specific target chip. If no specific target chip is specified in target spread field 264, the process proceeds from block 705 to block 706, sets the scope of transmission to the scope indicated in the END target scope field 262 of the relevant END 261, and passes through page connector C to FIG. 7B. If process 705 determines that all possible targets of the interrupt bus command reside in one processing unit chip, the process passes from block 705 through page connector E to the directed poll command processing shown in FIG. 7F and described below.

Figure 7B:
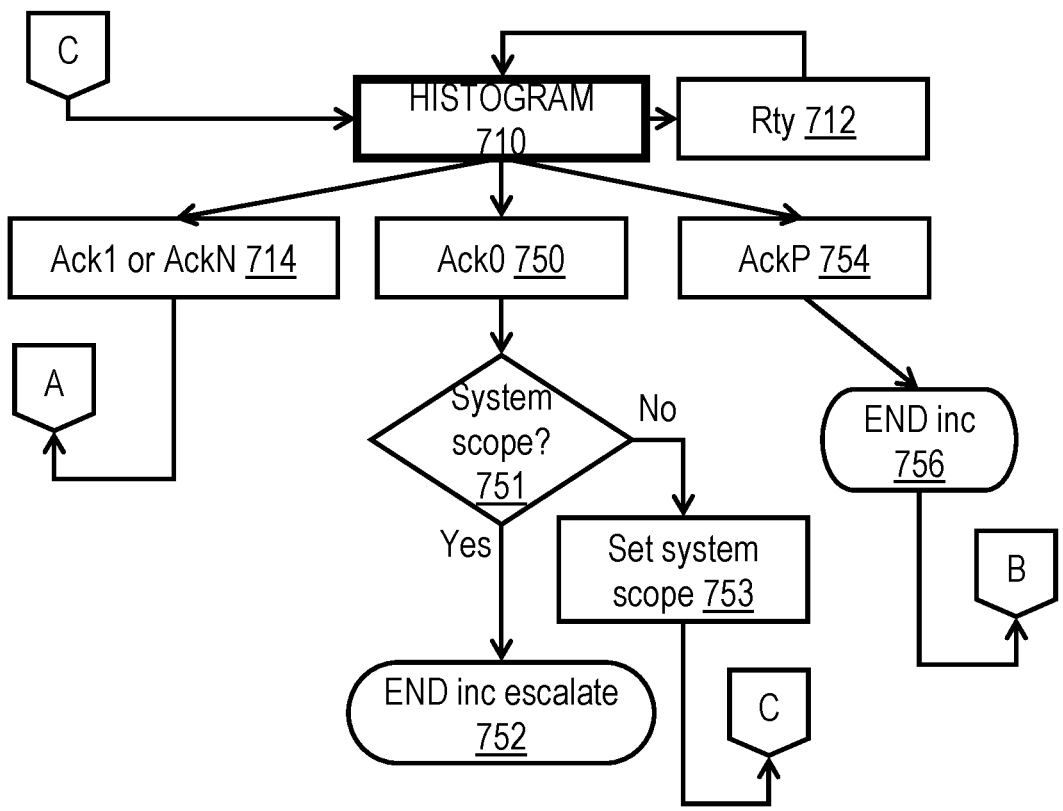

As discussed above, all VPs running in a data processing system 100 have an associated interrupt-related "age" indicated in the Age field of the VP's associated row in one of ICTs 222. Generally speaking, the interrupt histogram command processing illustrated in FIG. 7B determines the identity or identities of the "oldest" VP thread(s), that is, the VP thread(s) that have not serviced an interrupt for the longest time. The age determined by the interrupt histogram command processing of FIG. 7B is used in the subsequent poll command processing shown in FIG. 7C or FIG. 7F in that only the VP thread(s) having at least the age specified in an interrupt poll command signal availability to service an interrupt. If the interrupt poll command issued in FIG. 7C has a single target (e.g., one processing unit chip specified in the aTAG), the interrupt is delivered to the target. If, however, the interrupt poll command has multiple targets, the INT master 216 selects one of them to service the interrupt and assigns the selected target utilizing the interrupt assign command processing shown in FIG. 7D. If the interrupt histogram command processing illustrated in FIG. 7B does not identify a VP thread capable of servicing the interrupt, a backlog count in the backlog count field 266 of the END 261 for the interrupt source in END table 260 is incremented and escalation of the interrupt may be triggered. If all possible targets are "precluded" (e.g., the VP threads are running at higher priority than the interrupt), a backlog count in the backlog count field 266 of the END 261 for the interrupt source in END table 260 is incremented, and INT master 216 issues an interrupt broadcast command that sets the pending bits in the target ICTs 222 utilizing the interrupt broadcast command processing given in FIG. 7E. If the broadcast command processing fails to find a VP thread to service the interrupt, an escalation is triggered.

Because of the virtualization of threads, interrupts are delivered based on VP thread information rather than PP information, and the physical location of a target VP within data processing system 100 is not known purely based on the identity of the selected target VP. However, in practice, the physical location at which a VP thread is scheduled within data processing system 100 changes slowly relative to instruction execution, and group interrupt delivery is not required to be precise. Consequently, not all targets of an interrupt are required to receive all interrupt bus commands, and the values of Age fields do not have to be precise. Consequently, an INT master 216 can use historical information from a previous interrupt command to pre-determine the most likely scope of transmission of a subsequent interrupt command and defer re-discovery of possible interrupt targets to the end of the interrupt delivery (thus optimizing delivery of the interrupt to an available and capable target VP). The INT master 216 can update this historical information if needed when servicing interrupt is complete, for example, by recording in the target scope field 262 of the relevant END 261 in END table 260 a minimum interrupt bus command transmission scope utilized to service the interrupt and by recording in the target spread field 264 of the relevant END 261 an indication of whether or not a single processing unit chip contained all of the target VPs. If, in fact, a single processing unit and ICT 222 contained all of the target VPs of the interrupt, an abbreviated notification process shown in the directed poll command processing of FIG. 7F is preferably employed to further optimize interrupt delivery. In this case, the interrupt directed poll command, which is identified by SID valid field 516 being set (e.g., to '1'), indicates that only the specific ICT 222 specified in SID field 514 should accept and deliver the interrupt if it has a valid target VP.

It should be recalled that interrupt bus commands can be issued with multiple different scopes of transmission. In the described example embodiment, these scopes include a master chip (M) scope (e.g., a single processing unit), a group (G) scope including multiple but less than all processing units (e.g., one processing node 102 or 130), and a system (S) scope including all processing units in data processing system 100. To optimize latency, it is preferred if the interrupt histogram command, interrupt poll command, and interrupt assign command are transmitted, by default, with a group scope. As noted below, the interrupt broadcast and interrupt broadcastQ commands are preferably transmitted with a system scope.

With reference now specifically to FIG. 7B, based on receipt of an interrupt request, for example, from an ISC 228 or 232, INT master 216 may issue an interrupt histogram command, as illustrated at block 710. The interrupt histogram command samples the INT snoopers 220 within a particular scope of data processing system 100 and results in an indication of which VP threads are capable of handling a particular interrupt. In one preferred example, INT master 216 samples the INT snoopers 220 to determine the interrupt 'age' of the VP threads. As indicated in the embodiment of FIG. 5, the interrupt histogram command may include a command operand field 504 specifying an interrupt histogram command, a VP # field 506 that identifies one VP thread or a set of multiple VP threads, and a priority field 510 specifying an interrupt priority. In one example, a scope setting associated with each interrupt command controls the scope of transmission of the interrupt command on unit interconnect 208 and/or the system fabric. In one preferred embodiment, the default scope of transmission is a group scope; however, this scope can be varied by INT master 216 for individual interrupts based on scope settings in END table 260, which can be maintained for each interrupt source based on information gathered from previous interrupt commands (as discussed further below).

In one example, in response to the interrupt histogram command, each of the INT snoopers 220 within the scope of transmission of the interrupt histogram command returns a partial response complying with response tag specification 602. In one example, each INT snooper 220 may specify a partial response by searching ICT 222 for any VP threads that match the VP # specified in field 506 of the interrupt histogram command and by setting the response tag according to the results of the search, for example, as illustrated in FIG. 8.

Figure 8:
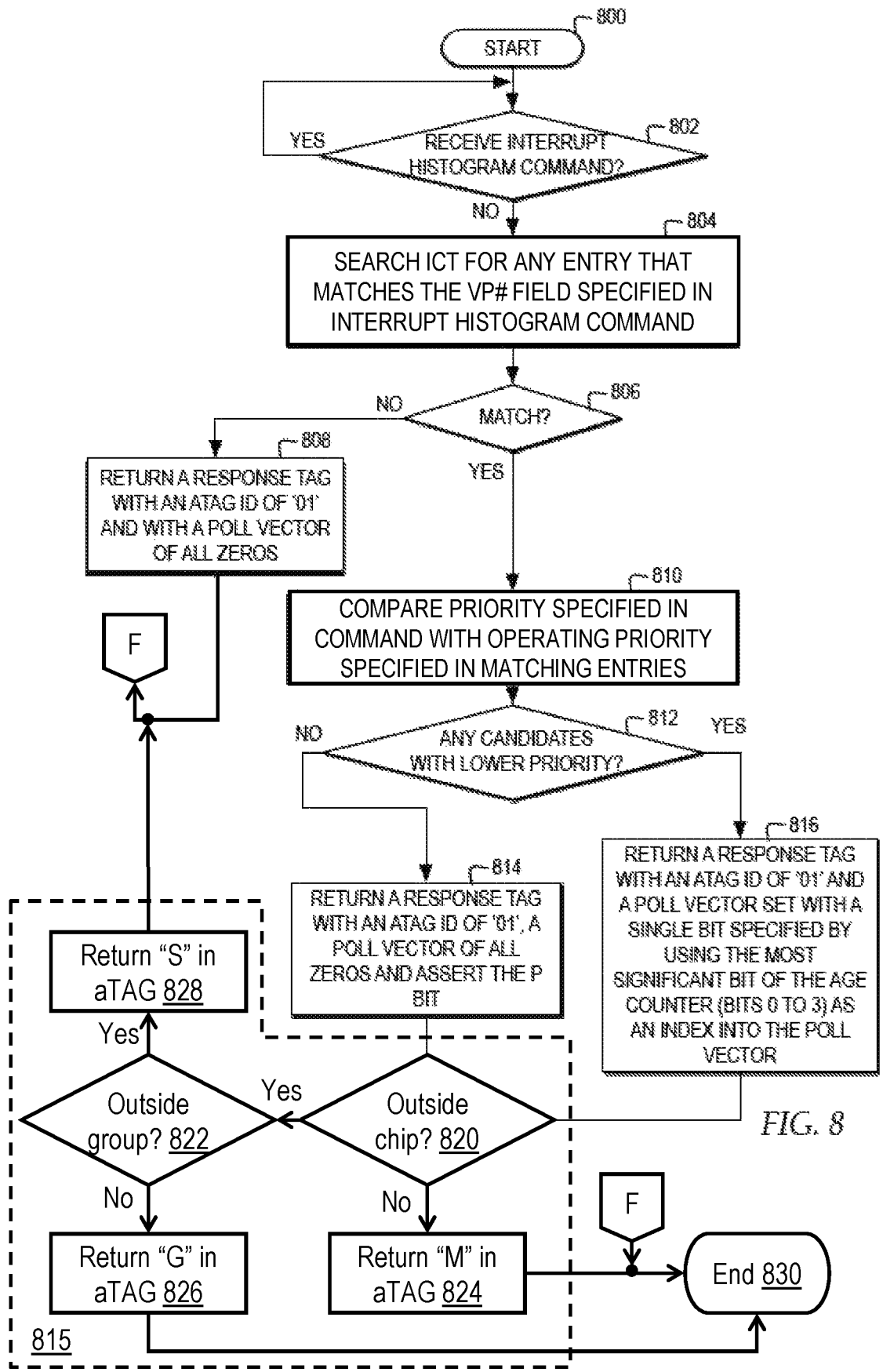
FIG. 8 is a high-level logical flowchart of an exemplary process by which interrupt snoopers distributed across multiple processing units in a data processing system determine their partial responses to an interrupt histogram command in accordance with one embodiment.

Referring now to FIG. 8, there is depicted a high-level logical flowchart of an exemplary process by which an INT snooper 220 receives an interrupt histogram command, determines a partial response to the interrupt histogram command, and provides the partial response in accordance with one embodiment. The process begins at block 800 and thereafter proceeds to block 802, which illustrates an INT snooper 220 monitoring for receipt of an interrupt histogram command. If an interrupt histogram command is received, the process passes to block 804, which illustrates the INT snooper 220 searching in its ICT 222 for any entry (or entries) specifying a VP # that matches the VP # specified in field 506 of the interrupt histogram command. Next, at block 806, INT snooper 220 determines whether or not any matching ICT entry was found at block 804. If not, then the process passes to block 808, which illustrates INT snooper 220 returning a partial response with an aTAG ID set to '01' and poll vector 604 set to all zeroes to indicate no matching VP thread was found. Thereafter, the process of FIG. 8 passes through page connector F and ends at block 830.

Returning to block 806, if INT snooper 220 detects a match between at least one of the thread context entries in ICT 222 and the VP # specified in field 506 of the interrupt histogram command, the process passes to block 810. Block 810 depicts the INT snooper 220 comparing the priority specified in priority field 510 of the interrupt histogram command with the operating priorities of the VP threads specified in the matching entries in ICT 222. In preferred embodiments, an interrupt can only be presented if the interrupt has a higher priority than the current operating priority of the VP thread (it should be noted that higher priorities are not necessarily indicated by numerically higher values). Next, at block 812, INT snooper 220 determines whether ICT 222 records context for any candidate VP threads having a lower priority than the priority specified in the interrupt histogram command. If not, INT snooper 220 builds a partial response with an aTAG ID of '01', a poll vector 604 of all zeroes, and the P bit asserted to '1' to indicate that a higher priority interrupt is pending (block 814).

The INT snooper 220 preferably additionally sets one of the S, G, and M scope bits in the partial response in accordance with the sub-process 815, which includes blocks 820-828 In particular, as shown at blocks 820-822, INT snooper 220 determines (e.g., based on a bus source tag) whether or not the interrupt bus command in question (e.g., the interrupt histogram command) originated from outside the processing unit chip containing the INT snooper 220 and/or outside of the group of processing units containing the INT snooper 220. In response to a determination that the interrupt bus command originated in the same processing unit chip as the INT snooper 220, the M bit is set in the aTAG of the partial response (block 824). In response to a determination that the interrupt bus command originated from a different processing unit chip but the same processing unit group as the INT snooper 220, the G bit is set in the aTAG of the partial response (block 826). In response to a determination that the interrupt bus command originated from outside of the processing unit group of the INT snooper 220, the S bit is set in the aTAG of the partial response (block 824). After INT snooper 220 transmits the partial response containing the aTAG to response logic 404, the process of FIG. 8 ends at block 830.

Returning to block 812, if INT snooper 220 determines that there are one or more candidate VP threads with a lower priority than that specified in priority field 510 of the interrupt histogram command, then the process passes to block 816. Block 816 illustrates INT snooper 220 building a partial response with an aTAG ID of '01' and a poll vector 604 specifying the oldest or "highest" age of all the VP threads that have lower operating priority than the interrupt priority set in priority field 510 of the interrupt histogram command. In one specific example, each Age field in ICT 222 is implemented as a four-bit counter, and a most significant non-zero bit of the counter is utilized as an index to set one of the bits in poll vector 604. INT snooper 220 additionally sets one of the M, G, and S bits in the partial response (block 815) and transmits the partial response to response logic 404. Thereafter, the process of FIG. 8 ends at block 830.

As discussed above, response logic 404 receives all the partial responses from the INT snoopers 220 within the scope of transmission of the interrupt broadcast command. The partial responses received from different INT snooper 220 may have multiple different bits set. Response logic 404 combines the partial responses to generate a combined response 426 containing a combined poll vector 604 including a set bit corresponding to each poll vector bit set in one of the partial responses, the P bit, the C bit, and scope bits, and an aTAG type. As indicated in FIG. 7B, the aTAG type of the interrupt histogram command can be "Ack0", "Ack1", "AckN", "AckP", or "Rty" in accordance with table 600.

As depicted in FIG. 7B, if INT master 216 receives a combined response 426 having an aTAG type of "Ack1" or "AckN" as illustrated at reference numeral 714, the process passes through page connector A to FIG. 7C, which, as described below, represents INT master 216 issuing an interrupt poll command to assess the availability of one or more VP thread(s) to service the interrupt. If INT master 216 receives a combined response 426 having an aTAG type of "Ack0" as illustrated at reference numeral 750, indicating that no currently running VP was found in the scope of transmission, then the process of FIG. 7B proceeds to block 751, which illustrates INT master 216 determining whether or not the interrupt histogram command for which the combined response 426 was received was transmitted with a system scope or group scope. If the interrupt histogram command was issued with group scope, INT master 216 reissues the interrupt histogram command with a system scope, as indicated by the process proceeding to block 753 and then returning to block 710 through page connector C. If INT master 216 determines at block 751 that the interrupt histogram command was issued with system scope, INT master 216 increments a backlog count for the interrupt maintained in backlog count field 266 of the relevant END 261 in END table 260 and escalates the interrupt to a higher software level, as indicated by the END increment escalate operation shown at block 752. The escalation of the interrupt allows additional VP threads to be polled when the partial responses to the interrupt histogram command indicate that VP threads associated with a current software stack level are interrupted too frequently. If INT master 216 receives a combined response 426 having an aTAG type of "AckP" as illustrated at reference numeral 754, this condition indicates at least one VP thread is running but is not currently able to process an escalation because the VP thread has a higher operating priority than the interrupt. In response, INT master 216 increments a backlog count (in backlog count field 266) for the interrupt in END table 260, as indicated by the END INC operation shown at block 756. The process then proceeds through page connector B to FIG. 7E, which depicts INT master 216 issuing an interrupt broadcast command, as described below. The interrupt broadcast command notifies the affected ICTs 222 that there is an interrupt reflected in the counter backlog which the ICTs 222 should consider. Referring to block 712, if INT master 216 receives a Cresp 426 of "Rty", then INT master 216 re-issues another interrupt histogram command, as illustrated at block 710.

Figure 7C:
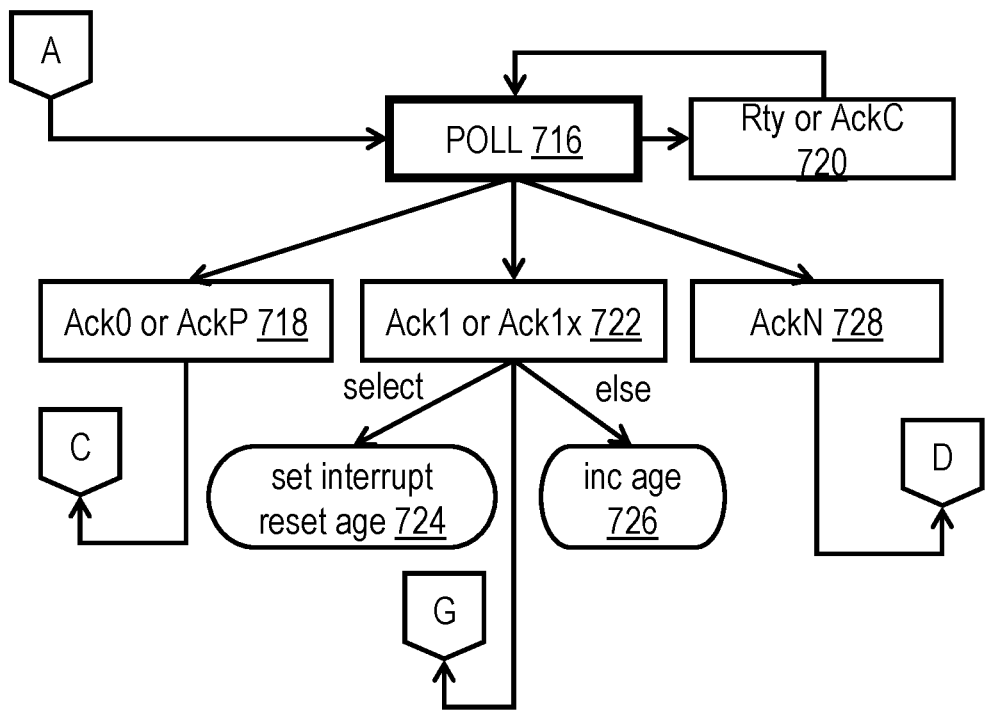

With reference now specifically to FIG. 7C, based on receipt of an interrupt request, for example, from an ISC 228 or 232, INT master 216 may issue an interrupt poll command, as illustrated at block 716, to the selected scope to determine the availability of VP threads to service the interrupt. The interrupt poll command facilitates this determination by determining which INT snoopers 220 meet the criteria specified in VP # field 506, priority field 510, and age field 512, as illustrated at reference numeral 522. The content of the age field 512 is determined by the combination of the combined age information collected in the combined poll vector 604 by INT master 216 in response to the interrupt histogram command.

In one example, in response to the interrupt poll command, each of the INT snoopers 220 in the transmission scope returns a partial response complying with response tag specification 602. In one example, each INT snooper 220 may determine its response tag by searching its ICT 222 based on a determination regarding whether there are any VP threads available to the INT snooper 220 to service the interrupt, as illustrated in FIG. 9.

Figure 9:
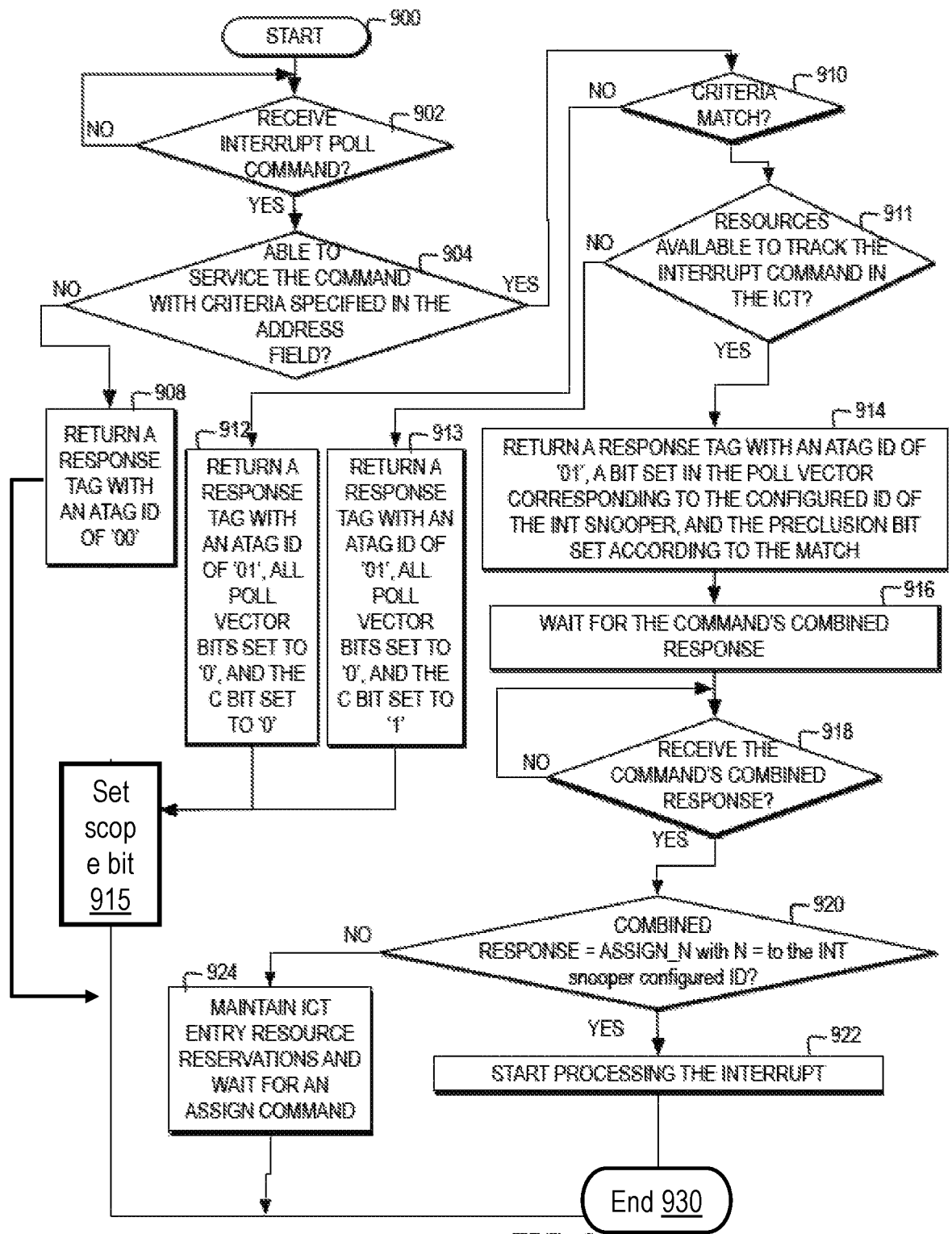
FIG. 9 is a high-level logical flowchart of an exemplary process by which interrupt snoopers distributed across multiple processing units in a data processing system determine their partial responses to an interrupt poll command in accordance with one embodiment.

With reference now to FIG. 9, there is illustrated a high-level logical flowchart of an exemplary process by which an interrupt snooper receives an interrupt poll command, determines a partial response to the interrupt poll command, and provides the partial response in accordance with one embodiment. The process of FIG. 9 begins at block 900 and thereafter proceeds to block 902, which illustrates an INT snooper 220 monitoring to detect an interrupt poll command. In response to receipt of an interrupt poll command, the process passes to block 904. Block 904 illustrates a determination by INT snooper 220 whether ICT 222 records a VP thread matching the VP # criteria specified in field 506 of the interrupt poll command. At block 904, if ICT 222 does not record a VP thread matching the VP # criteria specified in field 506, then the process passes to block 908. Block 908 illustrates INT snooper 220 returning a partial response with an aTAG ID of '00'. Thereafter, the process of FIG. 9 ends at block 930.

Returning to block 904, if INT snooper 220 makes an affirmative determination, then the process passes from block 904 to block 910. Block 910 illustrates INT snooper 220 determining whether the criteria specified in fields 510 and 512 of the interrupt poll command matches the contents of any of the entries in ICT 222 qualified in block 904. If no ICT entry matching the specified criteria is found at block 910, then the process passes to block 912, which illustrates INT snooper 220 returning a partial response with the aTAG ID of '01', all poll vector bits set to '0', and the C bit set to '0'. As additionally indicated at block 915, INT snooper 220 additionally sets one of the S, G, or M bits in the aTAG to indicate its physical location in data processing system 100 with respect to the INT master 216 that issued the interrupt poll command. In one embodiment, the process employed at block 915 can be the same as that described above with reference to block 815 of FIG. 8. Thereafter, the process of FIG. 9 ends at block 930.

Returning to block 910, if INT snooper 220 detects a criteria match for the interrupt poll command in ICT 222, the process passes to block 911. Block 911 illustrates INT snooper 220 determining whether ICT 222 has resources available to track the interrupt command. In response to a negative determination at block 911, INT snooper 220 builds a partial response with an aTAG ID of '01', all poll vector bits set to '0', and the C bit set to '1' (block 913). As additionally indicated at block 915, INT snooper 220 additionally sets one of the S, G, or M bits in the aTAG to indicate its relative physical location in data processing system 100 with respect to the INT master 216 that issued the interrupt poll command. Thereafter, the process ends at block 930.

Returning to block 911, if INT snooper 220 determines ICT 222 has resources available to track the interrupt command, INT snooper 220 returns a partial response with the aTAG ID of '01', a bit set in the poll vector 604 corresponding to the configured ID of the INT snooper 220 and, if the INT snooper 220 is precluded, a set P bit (block 914). INT snooper 220 then waits for receipt of combined response of the interrupt poll command from response logic 404 (blocks 916-918). In response to receipt of the combined response, INT snooper 220 determines whether the Cresp specifies an "Assign_N" setting with N set to the configured ID of the INT snooper 220 (block 920). In this case, a Cresp of "Assign_N" indicates a single INT snooper 220 responded with a partial response to the interrupt poll command and is accordingly assigned the interrupt. If the combined response is not set to an "Assign_N" with N set to the configured ID of the INT snooper 220, but is instead set to "Ack_done", then the process passes to block 924. Block 924 illustrates INT snooper 220 reserving an ICT entry resource for the interrupt and waiting for an interrupt assign command. Thereafter, the process of FIG. 9 ends at block 930. Returning to block 920, if the combined response is set to "Assign_N" with the N set to the configured ID of the INT snooper 220, then INT snooper 220 begins processing of the interrupt (block 922). In one example, starting to process the interrupt may include, for example, setting an assigned field associated with a selected VP thread in ICT 222 to indicate the interrupt is assigned to the VP thread and asserting the relevant one of exception lines 224. Thereafter, the process of FIG. 9 ends at block 930.

Returning to FIG. 7C, INT master 216 receives a combined response 426 of the interrupt poll command from response logic 404. In the illustrated example, if INT master 216 receives a combined response including an aTAG type of "Ack0" or "AckP" as illustrated at reference numeral 718, then no INT snooper 220 responded indicating matching criteria and no collision (C) bit was set. Accordingly, INT master 216 reissues the interrupt histogram command, as illustrated at reference numeral 710. Alternatively, if INT master 216 receives a combined response 426 having an aTAG type of "Ack1" or "Ack1x" as illustrated at reference numeral 722, then a single INT snooper 220 responded indicating that it has a match for the interrupt criteria and is handling the interrupt. Accordingly, INT master 216 sends an interrupt reset age command to direct the INT snooper 220 that is handling the interrupt to reset the Age field of the relevant VP thread to "0" to indicate it now has the youngest thread age among the matching VP threads (block 724). INT master 216 additionally directs all other INT snoopers 220 having ICT entries that matched the criteria of the interrupt poll command to increment the associated ages to increase the likelihood of those VP threads being selected by a next interrupt poll command (block 726). The process then passes through page connector G to FIG. 7D.

Referring now to block 728, if INT master 216 receives a combined response 426 having an aTAG type of "AckN", then multiple INT snoopers 220 responded with partial responses indicating matching criteria. Accordingly, INT master 216 issues an interrupt assign command with a particular INT snooper 220 selected, as illustrated by the process passing through page connector D to FIG. 7D. Alternatively, as illustrated at reference numeral 720, if INT master 216 receives a combined response 426 having an aTAG type of "AckC" or a Cresp of "Rty", at least one INT snooper 220 responded indicating matching criteria but with a C bit set or by providing a retry partial response or the interrupt poll command was dropped. In response, INT master 216 reissues an interrupt poll command, as illustrated by the process returning to reference numeral 716.

Figure 7D:
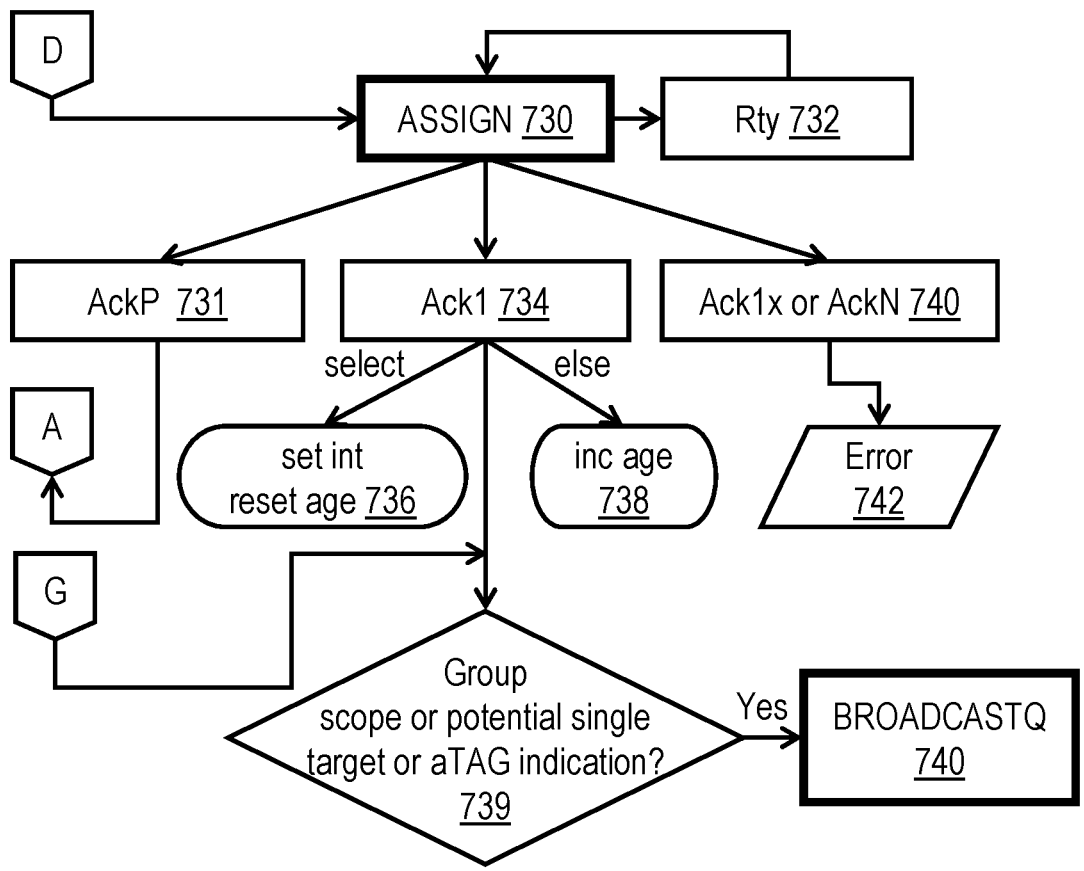
Figures 10, 11:
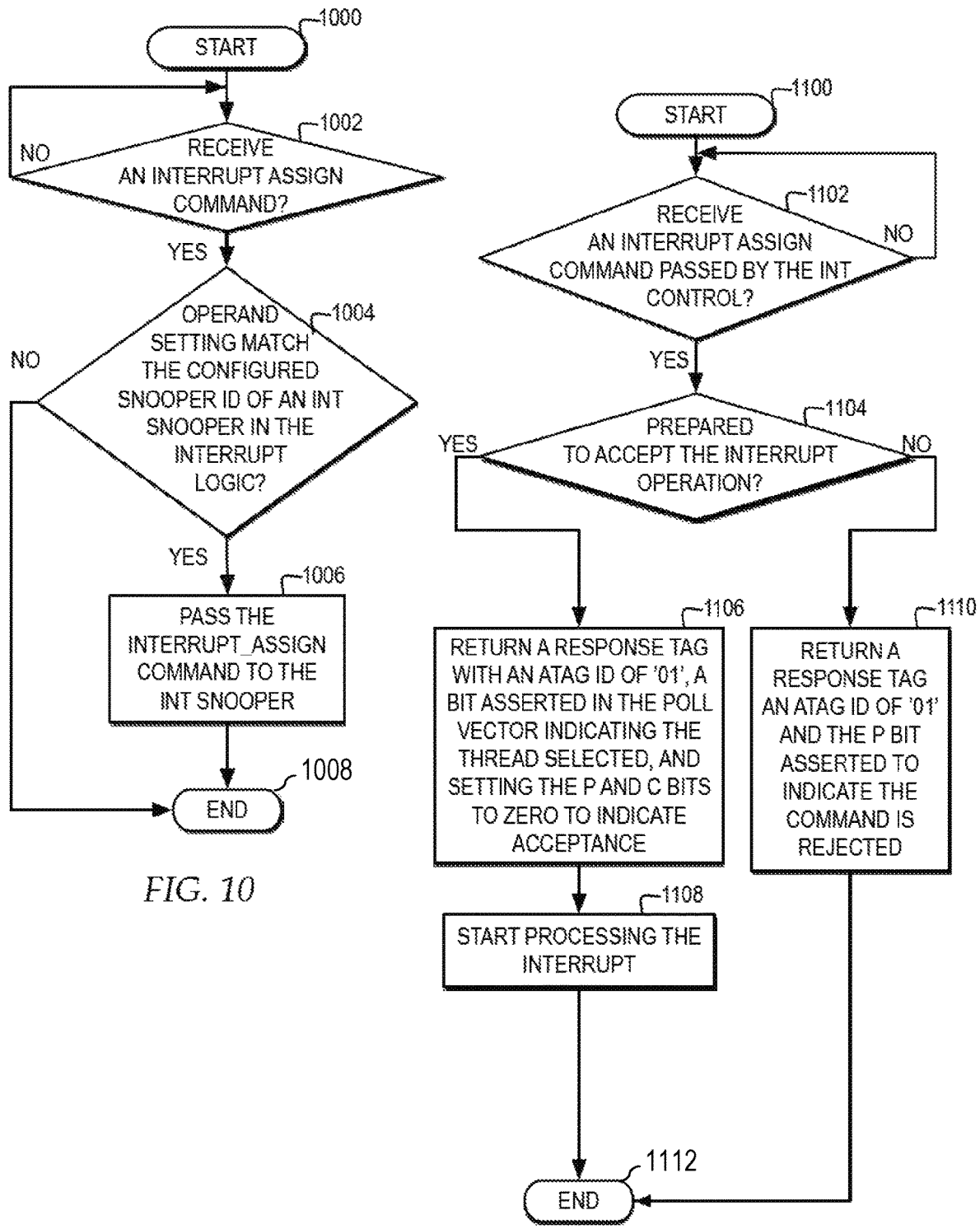
FIG. 10 is a high-level logical flowchart of an exemplary process by which interrupt snoopers distributed across multiple processing units in a data processing system determine their partial responses to an interrupt assign command in accordance with one embodiment.
FIG. 11 illustrates a high-level logical flowchart of an exemplary process by which a particular interrupt snooper provides a response tag for indicating a response to an interrupt assignment in accordance with one embodiment.

Referring now to FIG. 7D, the process of issuing an interrupt assign command begins at page connector D and proceeds to block 730, which illustrates an INT master 216 selecting a particular INT snooper 220 from among those responding to an interrupt poll command and issuing a single interrupt assign command specifying the snooper ID of the selected INT snooper 220. FIG. 10 illustrates an exemplary process by which an instance of INT control logic 218 determines whether an interrupt assign command matches a snooper ID for an INT snooper 220 in its instance of interrupt logic 214, and FIG. 11 illustrates an exemplary process by which an INT snooper 220 accepts or rejects an interrupt assignment specified in an interrupt assign command.

Referring now to FIG. 10, there is depicted a high-level logical flowchart of a process by which an interrupt controller receives an interrupt assign command, determines a partial response to the interrupt assign command, and provides the partial response in accordance with one embodiment. In one example, the process starts at block 1000 and thereafter proceeds to block 1002. Block 1002 illustrates an instance of INT control logic 218 monitoring to detect whether or not an interrupt assign command has been received. At block 1002, if an interrupt assign command has been received, the process passes to block 1004. Block 1004 illustrates INT control logic 218 determining whether the operand setting in the interrupt assign command matches the configured snooper ID of an INT snooper 220 associated with the INT control logic 218. If INT control logic 218 determines at block 1004 that the operand setting in the interrupt assign command does not match the configured snooper ID of an INT snooper 220 associated with the INT control logic 218, then the process ends at block 1008. If INT control logic 218 determines at block 1004 that the operand setting in the interrupt assign command matches the configured snooper ID of an INT snooper 220 associated with the INT control logic 218, then the process passes to block 1006, which illustrates the INT control logic 218 passing the interrupt assign command to the INT snooper 220 associated with the INT control logic 218. Thereafter, the process ends at block 1008.

With reference now to FIG. 11, there is illustrated a high-level logical flowchart of an exemplary process by which a particular interrupt snooper determines and provides a partial response to an interrupt assign command in accordance with one embodiment. As illustrated, the process starts at block 1100 and thereafter proceeds to block 1102, which illustrates an INT snooper 220 determining whether an interrupt assign command has been received from the associated INT control logic 218. In response to receipt of an interrupt assign command INT snooper 220 determines whether it can accept the interrupt operation (block 1104). For example, INT snooper 220 may determine that it cannot accept the interrupt operation if an entry in ICT 222 that had been reserved in response to the interrupt poll command has been disabled prior to receiving the interrupt assign command or if the operating priority of the VP thread has changed.

If the INT snooper 220 determines at block 1104 that it is prepared to accept the interrupt operation, then the process passes to block 1106. Block 1106 illustrates INT snooper 220 returning a partial response with an aTAG ID of '01', a bit asserted in the poll vector indicating the VP thread selected, and the P and C bits set to zero to indicate acceptance. In addition, at block 1108, INT snooper 220 starts to process the interrupt operation. Thereafter, the process of FIG. 11 ends at block 1112. Returning to block 1104, if the INT snooper 220 is not prepared to accept the interrupt operation, then INT snooper 220 returns a partial response with an aTAG ID of '01' and with the P bit set to '1' to indicate the command is rejected (block 1110). Thereafter, the process of FIG. 11 ends at block 1112.

Following the processing illustrated in FIG. 11, INT master 216 receives from response logic 404 a combined response 426 containing the aTAG type indicated by a single partial response provided by the targeted INT snooper 220 in response to the interrupt assign command. Referring again to FIG. 7D, if INT master 216 receives a combined response 426 having an aTAG type of "Ack1" (block 734), INT master 216 determines that the selected INT snooper 220 has accepted handling the interrupt. INT master 216 accordingly directs the INT snooper 220 that is handling the interrupt to reset the Age field of the relevant VP thread to "0" in ICT 222 to indicate that the VP thread is the "youngest" thread in its group scope (block 736). INT master 216 additionally directs all other INT snoopers 220 having matching entries in their associated ICTs 222 to increment the Age field of the entries to increase the likelihood of the associated VP threads being selected during a next interrupt command distribution (block 738). As further illustrated at block 739, following block 734 of FIG. 7D or block 722 of FIG. 7C and page connector G, INT master 216 additionally determines whether or not to additionally issue an interrupt broadcastQ (broadcast query) command, as shown at block 740. In at least one embodiment, processing of the interrupt broadcastQ command by INT master 216 follows the same steps as the interrupt broadcastQ command discussed below with reference to FIG. 7E, but does not trigger any updates to ICTs 222. Processing of the interrupt broadcastQ command by INT snoopers 220 is discussed further below with reference to FIG. 14. In one embodiment, INT master 216 determines to issue an interrupt broadcastQ command at block 740 if the interrupt assign command was issued with group scope, or if potentially a single target INT snooper 220 was present in the scope of the interrupt assign command as indicated by both a single age in the combined response 426 for the initial histogram command 710 and an Ack1 response in the combined response 426 for the interrupt poll command 716 (as this provides a strong indication all targets are on a single chip), or if the aTAG of combined response 426 indicates only potential targets in "M" or "G" scope (considering both chipID encode 604 as well as the "M", "G", and "S" bits in the combined response 426) while the command was issued at system scope. In one embodiment, the interrupt broadcastQ command employs the same format as an interrupt broadcast command as defined by interrupt broadcast specification 540.

Still referring to FIG. 7D, if INT master 216 receives a combined response for the interrupt assign command having an aTAG type of "AckP" as illustrated at reference numeral 731, then the target INT snooper 220 reserved resources for the interrupt in response to the interrupt poll command, but was not available to handle the interrupt when the interrupt assign command arrived. INT master 216 therefore re-issues the interrupt poll command with the prior age setting, as indicated by the process returning to FIG. 7C through page connector A. Alternatively, if INT master 216 receives a combined response having an aTAG type of "Ack1X" or "AckN" (block 740), then multiple INT snoopers 220 responded to the interrupt assignment command—a case which should not occur for an interrupt assign command targeting only a single INT snooper 220. Consequently, in this case, INT master 216 triggers an error, as illustrated at reference numeral 742. Alternatively, if INT master 216 receives a Cresp of "Rty" (block 732), then the target INT snooper 220 responded indicating acceptance but with a collision (C) bit set or the target INT snooper 220 responded indicating that the command should be retried or the interrupt assign command was dropped. In this case, INT master 216 reissues the interrupt assign command, as illustrated by the process returning to block 730.

Figure 7E:
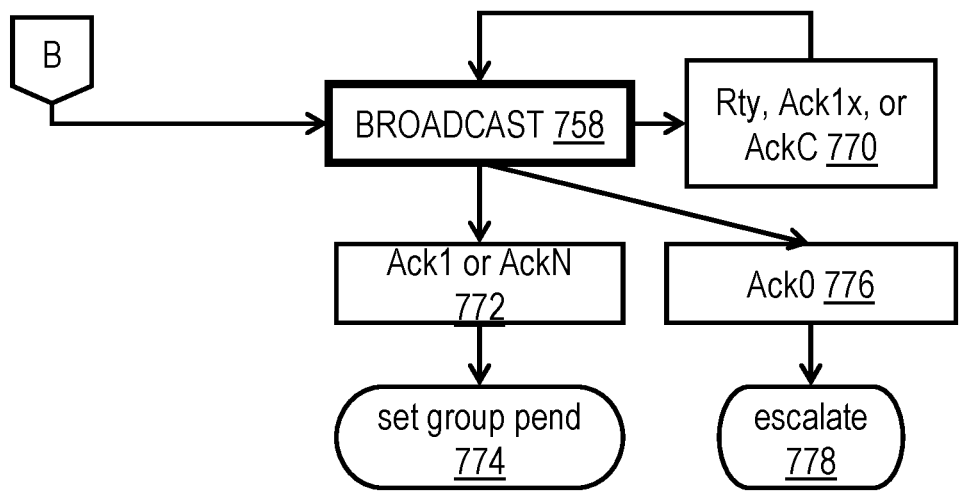
Figure 7F:
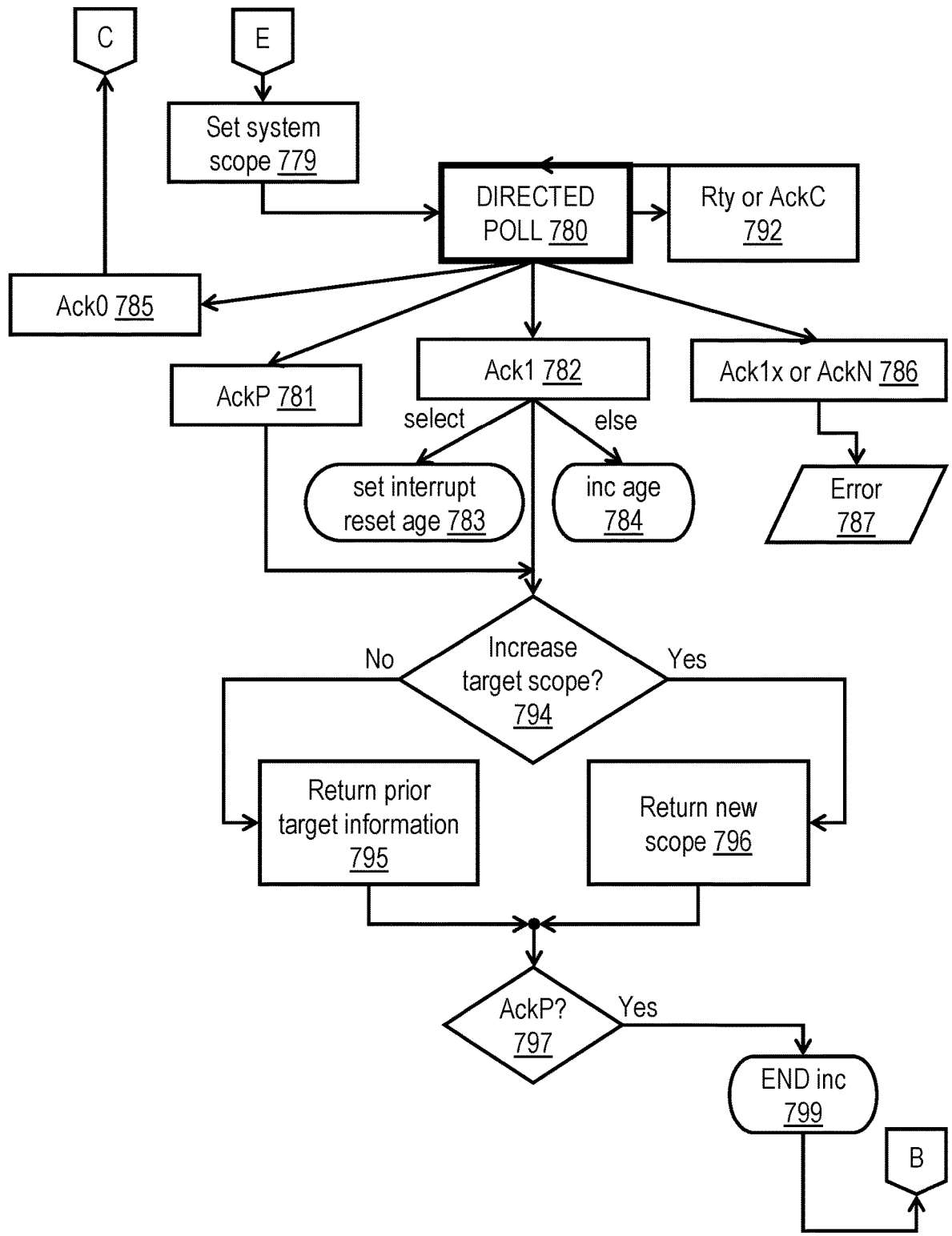

Referring now to FIG. 7E, the process begins at page connector B and then proceeds to block 758, which illustrates INT master 216 issuing a single interrupt broadcast command to determine if the interrupt needs to be escalated or if there is any potential VP thread that is currently running that can service the interrupt. In the example depicted in FIG. 5, the interrupt broadcast command includes a VP # field 532 identifying one or more VP threads that may potentially service the interrupt. In one example, each of the INT snoopers 220 may return a partial response containing an acknowledge vector in response to the interrupt broadcast command, as discussed below with reference to FIG. 12. In one example, each INT snooper 220 is configured with a unique snooper ID that serves as an index into the poll vector 604 of the partial response to the interrupt broadcast command.

Figure 12:
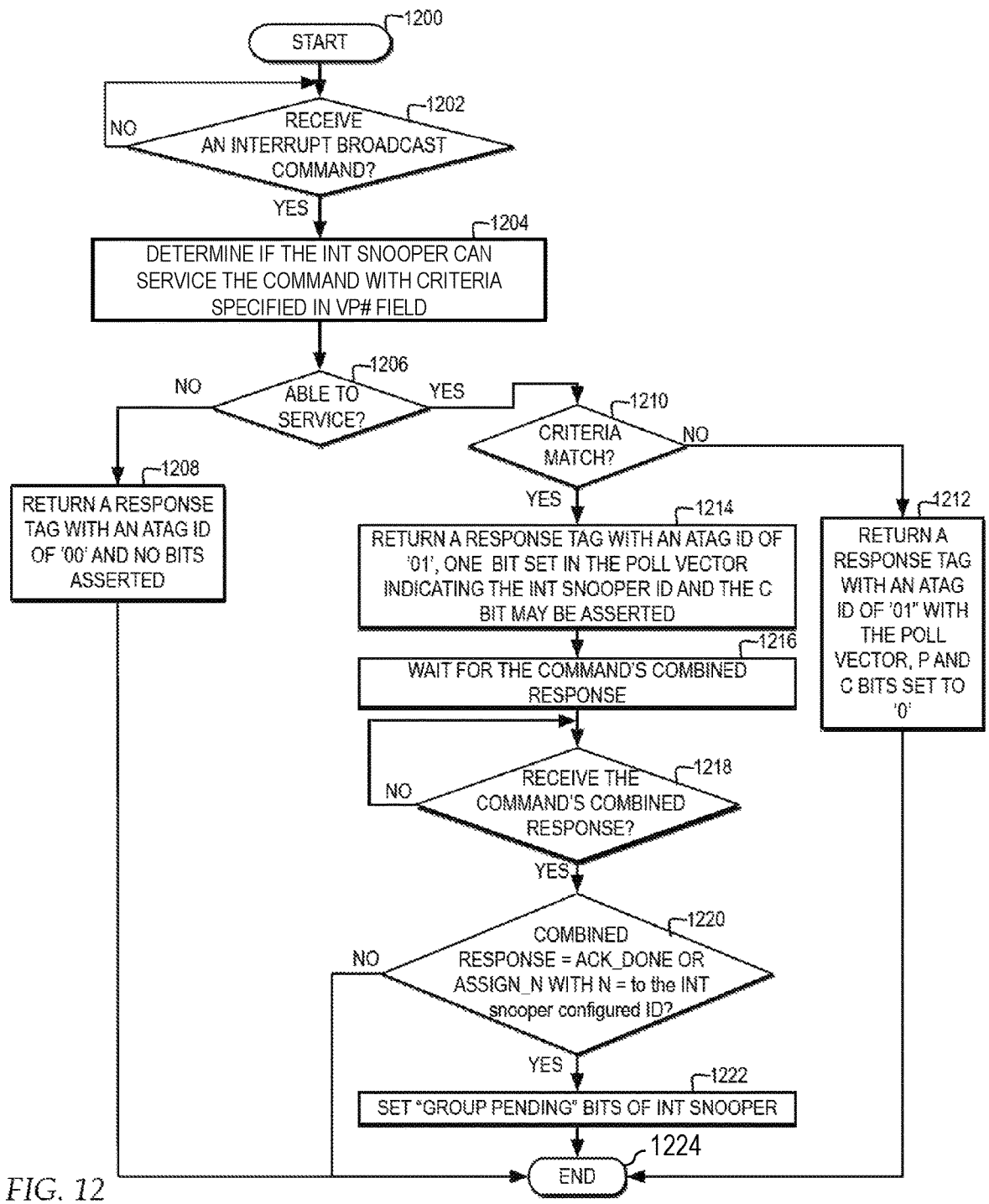
FIG. 12 is a high-level logical flowchart of an exemplary process by which interrupt snoopers distributed across multiple processing units in a data processing system determine their partial response to an interrupt broadcast command in accordance with one embodiment.

Referring now to FIG. 12, there is depicted high-level logical flowchart of an exemplary process by which an interrupt snooper in a data processing system receives an interrupt broadcast command, determines a partial response to the interrupt broadcast command, and provides the partial response in accordance with one embodiment. The process of FIG. 12 begins at block 1200 and thereafter proceeds to block 1202, which illustrates an INT snooper 220 monitoring to detect whether an interrupt broadcast command has been received. In response to detecting that an interrupt broadcast command has been received, the INT snooper 220 determines if the INT snooper is able to service the command with the criteria specified in VP # field 532 (blocks 1204-1206).

If the INT snooper 220 determines at block 1206 that it is not able to service the interrupt, INT snooper 220 returns a partial response having a TAG ID of '00' and no bits asserted, indicating a retry partial response (block 1208). Thereafter, the process of FIG. 12 ends at block 1224. However, if the INT snooper 220 determines at block 1206 that it is able to service the interrupt, INT snooper 220 additionally determination at block 1210 whether there is a criteria match between the contents of VP # field 532 and any of the VP # fields in ICT 222 (block 1210). If not, INT snooper 220 returns a partial response with a tag ID of '01' and with the poll vector, P bit, and C bit each set to '0' (block 1212). Thereafter, the process of FIG. 12 ends at block 1224.

Returning to block 1210, if INT snooper 210 detects a criteria match at block 1210, the process proceeds to block 1214, which illustrates INT snooper 220 returning a partial response with an aTAG ID of '01', one bit set in the poll vector indicating the snooper ID assigned to the INT snooper 220, and possibly with the C bit asserted. In one example, the C bit may be asserted if INT snooper 220 does not have sufficient resources to track the interrupt broadcast command and no snooper ID bit is set. Next, blocks 1216-1218 illustrate the INT snooper 220 awaiting the Cresp 426 of the interrupt broadcast command. At block 1220, INT snooper 220 determines whether the Cresp indicates an "Ack_done" or "Assign_N" setting with N set to the snooper ID of the INT snooper 220. In either of these cases, INT snooper 220 sets a "group pending" status for each ICT entry having a criteria match with the interrupt broadcast command to indicate there is/are lower priority group interrupts pending. Thereafter, the process of FIG. 12 ends at block 1224.

Returning to FIG. 7E, following issuance of the interrupt broadcast command at block 758, INT master 216 receives a combined response 426 from response logic 404. If the combined response 426 of the interrupt broadcast command specifies an aTAG type of "Ack1" or "AckN" as illustrated at reference numeral 772, one or more INT snoopers 220 responded as available to handle the interrupt. Accordingly, INT master 216 issues a command to cause the relevant INT snoopers 220 to set the "group pending" indicator for each ICT entry that has a criteria match for the interrupt broadcast command, as illustrated at reference numeral 774. Alternatively, if INT master 216 receives a combined response 426 having an aTAG type of "Ack0" as illustrated at reference numeral 776, then no INT snoopers 220 are available for processing the interrupt within the selected transmission scope. Accordingly, INT master 216 escalates the interrupt command as illustrated at reference numeral 778. Alternatively, if INT master 216 receives a combined response 426 having an aTAG type of "AckC" or "Ack1X" or a Cresp of "Rty" as illustrated at reference numeral 770, then INT master 216 reissues an interrupt broadcast command, as illustrated by the process returning to block 758.

Referring now to FIG. 7F, in response INT master 216 determining from the scope information provided by END 261 that an interrupt directed poll command can be used and therefore also the gathering of histogram information can be skipped, the process passes through page connector E from FIG. 7A and sets the scope of transmission of a interrupt directed poll command to system scope at block 779. It is preferable if the interrupt directed poll command is transmitted at a system scope (rather than the group scope) as the latency associated with delivery the interrupt directed poll command itself does not have a substantial negative effect on performance as interrupt processing is always initiated by the INT snooper 220 prior to receipt of combined response by the INT snooper 220 if the interrupt directed poll command finds a target. By sending the interrupt directed poll command at system scope, INT snoopers 220 on "non-targeted" chips can determine if they have a newly-running VP thread that is a potential target and can provide this information to the INT master 216 (i.e., that it may be helpful to expand the target scope from chip scope) for use in subsequent interrupt commands. The process proceeds from block 778 to block 780, which illustrates INT master 216 issuing an interrupt directed poll command. As depicted in FIG. 5, the interrupt directed poll command preferably includes not only command operand field 504, VP # field 506, priority field 510, and age field 512, but also snooper ID field 514 and SID valid field 516. As the histogram operation 710 that provides the information for the age field is skipped in this flow, the age field is set to all 0s by the INT master 216 to include as targets all potential VP thread targets in the single INT target snooper 220. In response to receipt of the interrupt directed poll command, the target INT snooper 220 may determine its response tag by searching its ICT 222 based on a determination regarding whether a VP thread is available to the INT snooper 220 to service the interrupt, as illustrated in FIG. 13.

Figure 13:
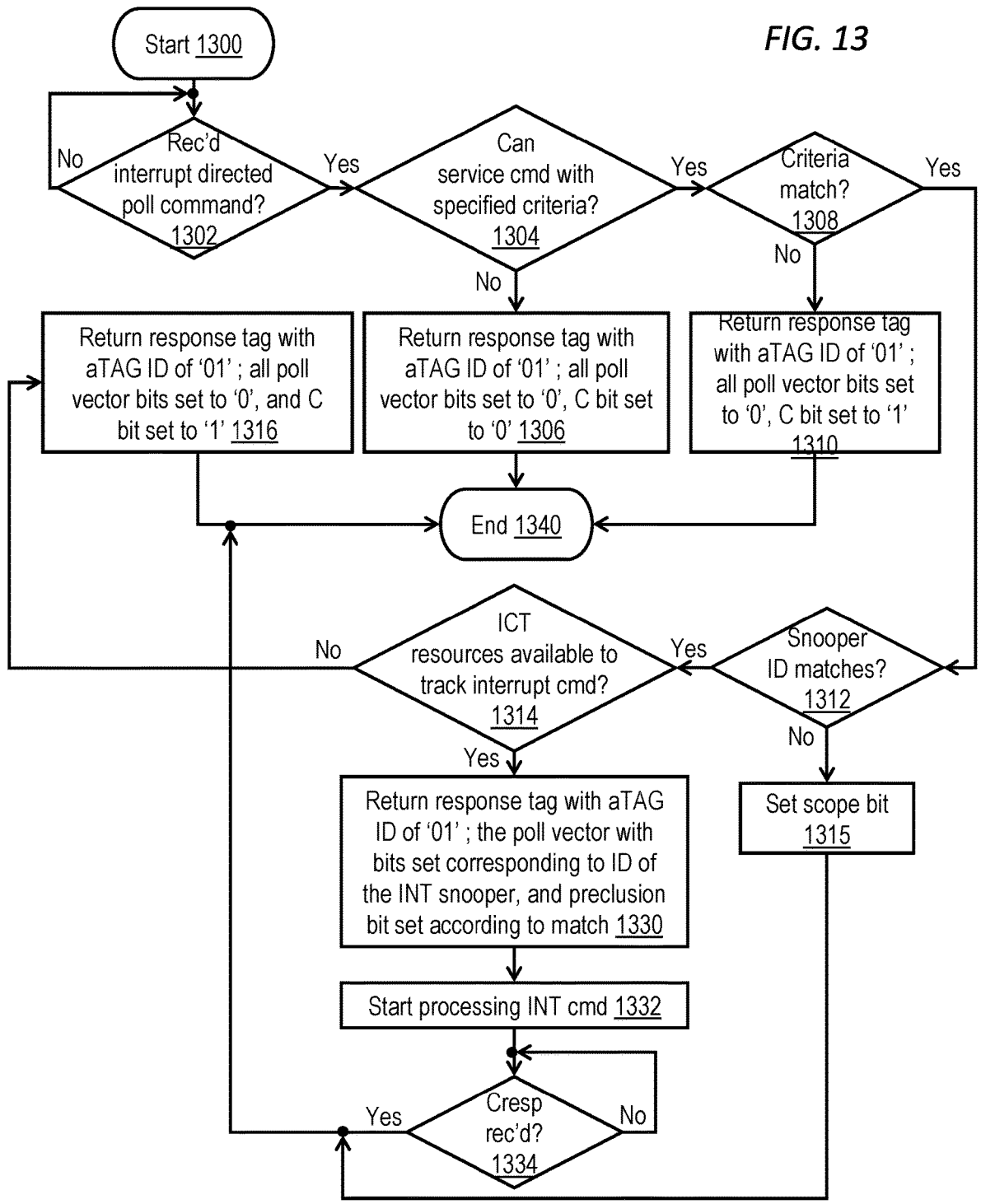
FIG. 13 is a high-level logical flowchart of an exemplary process by which an interrupt snooper in a data processing system determines a partial response to a interrupt directed poll command in accordance with one embodiment.

With reference now to FIG. 13, there is illustrated a high-level logical flowchart of an exemplary process by which an interrupt snooper in a data processing system receives an interrupt directed poll command, determines a partial response to the interrupt directed poll command, and provides the partial response in accordance with one embodiment. The process begins at block 1300 and thereafter proceeds to block 1302, which illustrates an INT snooper 220 monitoring to detect receipt of an interrupt directed poll command. In response to receipt of an interrupt directed poll command, the INT snooper 220 determines whether or not it is able to service the interrupt directed poll command with the criteria specified in fields 510 and 512 of the interrupt directed poll command (block 1304). Block 1304 illustrates a determination by INT snooper 220 whether ICT 222 records a VP thread matching the VP # criteria specified in field 506 of the interrupt poll command. At block 1304, if ICT 222 does not record a VP thread matching the VP # criteria specified in field 506, then the process passes to block 1306, which illustrates the INT snooper 220 returning a partial response with an aTAG ID of '01' and all bits of poll vector 604 and the C bit set to '0'. Thereafter, the process of FIG. 13 ends at block 1340.

Returning to block 1304, if INT snooper 220 is able to service the interrupt directed poll command with the specified criteria, then INT snooper 220 additionally determines at block 1308 whether the criteria specified in field 510 of the interrupt poll command matches the contents of any of the entries in ICT 222 qualified in block 1304. If no ICT entry matching the specified criteria is found at block 1308, then the process passes to block 1310, which illustrates INT snooper 220 returning a response tag with the aTAG ID of '01', all poll vector bits set to '0', and the C bit set to '1'. Thereafter, the process ends at block 1340.

Returning to block 1308, if INT snooper 220 detects a VP # criteria match for the interrupt poll command in ICT 222, INT snooper 220 additionally determines if it is the specified INT snooper specified in snooper ID field 514 of the interrupt directed poll command (block 1312). If not, INT snooper 220 sets one of the S, G, or M bits in the aTAG to indicate its relative physical location in data processing system 100 with respect to the INT master 216 that issued the interrupt poll command (block 1315). In one embodiment, the process employed at block 1315 can be the same as that described above with reference to block 815 of FIG. 8. Thereafter, the process ends at block 1340.

If, however, INT snooper 220 determines at block 1312 that its snooper ID matches the one specified in snooper ID filed 514, INT snooper 220 additionally determines at block 1314 whether or not ICT 220 has resources available to track the interrupt command. In response to a negative determination at block 1314, INT snooper 220 builds a partial response with an aTAG ID of '01', all poll vector bits set to '0', and the C bit set to '1' (block 1316). Thereafter, the process ends at block 1340. If, however. INT snooper 220 determines at block 1314 that ICT 222 has resources available to track the interrupt command, INT snooper 220 returns a partial response with the aTAG ID of '01', the poll vector 604 set to the configured ID of the INT snooper 220, and, if the INT snooper 220 is precluded, a set P bit (block 1330). INT snooper 220 then begins processing the interrupt without waiting for receipt of the combined response of the interrupt directed poll command from response logic 404, as it is the only INT snooper 220 that has a possible target for the interrupt (block 1332). In one example, starting to process the interrupt may include, for example, setting an assigned field associated with a selected VP thread in ICT 222 to indicate the interrupt is assigned to the VP thread and/or asserting the relevant one of exception lines 224. Block 1334 illustrates that INT snooper 220 awaits receipt of the Cresp and then ends the process of FIG. 13 at block 1340.

Returning to FIG. 7F, INT master 216 receives the combined response 426 of the interrupt directed poll command. As illustrated at reference numeral 792, if INT master 216 receives a combined response 426 having an aTAG type of "AckC" or a Cresp of "Rty", at least one snooper responded indicating matching criteria but with a C bit set or by providing a retry partial response or the interrupt poll command was dropped. In response, INT master 216 reissues an interrupt directed poll command, as illustrated by the process returning to reference numeral 780.

Assuming that the combined response 426 for the interrupt directed poll command does not indicate Rty or AckC, if INT master 216 receives a combined response including an aTAG type of "Ack0" at numeral 785, then the targeted snooper did not find a potential target running and passes through page connector C to FIG. 7B. If INT master 216 receives a combined response "AckP" as illustrated at reference numeral 781, then the targeted INT snooper 220 responded indicating matching criteria with a precluded target. The process then proceeds to block 794. Alternatively, if INT master 216 receives a combined response 426 having an aTAG type of "Ack1" as illustrated at reference numeral 782, then the targeted INT snooper 220 responded indicating that it has a match for the interrupt criteria and is handling the interrupt. Accordingly, INT master 216 sends an interrupt reset age command to direct the INT snooper 220 that is handling the interrupt to reset the Age field of the relevant VP thread to "0" to indicate it now has the youngest thread age among the matching VP threads (block 783). INT master 216 additionally directs all other INT snoopers 220 having ICT entries that matched the criteria of the interrupt poll command to increment the associated ages to increase the likelihood of those VP threads being selected by a next interrupt poll command (block 784). The process then proceeds to block 794. Alternatively, if INT master 216 receives a combined response having an aTAG type of "Ack1X" or "AckN" (block 786), then multiple INT snoopers 220 responded to the interrupt directed poll command — a case which should not occur for an interrupt directed poll command targeting only a single INT snooper 220. Consequently, in this case, INT master 216 triggers an error, as illustrated at reference numeral 787. INT master 216 further determines at block 794 whether or not to increase the target scope recorded for the interrupt in target scope field 262 in END table 260. In one embodiment, INT master 216 determines to increase the scope reflected in the target scope field 262 of the END 261 from a chip scope to a group scope or system scope or from a group scope to a system scope based on whether or not either of the G or S bits are set in the combined response 426 based on scope bit settings reported by an INT snooper 220, as discussed above with reference to block 1315. Based on this determination, INT master 216 either leaves the target scope information recorded in END table 260 unchanged (block 795) or increases the target scope in END table 260 so that future interrupt commands for the interrupt will be transmitted to one or more additional possible targets (block 796).

At block 797, the INT master 216 again determines if the combined response 426 has an aTAG type of "AckP", indicating that at least one VP thread is running but is not currently able to process an escalation because the VP thread is processing at a higher operating priority than the interrupt. If so, INT master 216 increments a backlog count (in backlog count field 266) for the interrupt in END table 260, as indicated by the END INC operation shown at block 799. The process then proceeds through page connector B to FIG. 7E, which depicts INT master 216 issuing an interrupt broadcast command. The interrupt broadcast command notifies the affected ICTs 222 that there is an interrupt reflected in the counter backlog which the ICTs 222 should consider.

Figure 14:
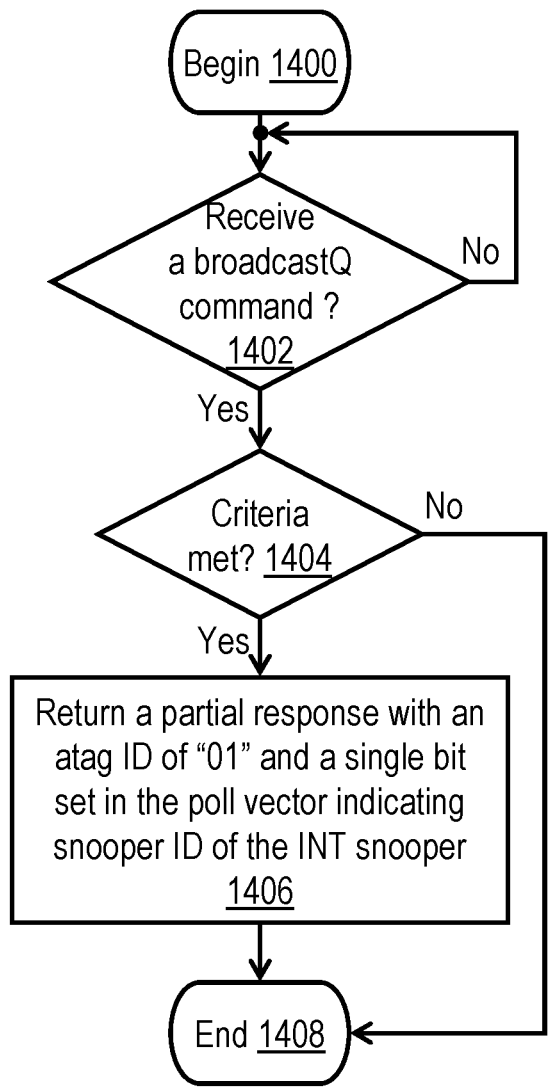
FIG. 14 is a high-level logical flowchart of an exemplary process by which interrupt snoopers distributed across multiple processing units in a data processing system determine their partial responses to an interrupt broadcastQ command in accordance with one embodiment.

Referring now to FIG. 14, there is depicted a high-level logical flowchart of an exemplary process by which an interrupt snooper in a data processing system receives an interrupt broadcastQ command, determines a partial response to the interrupt broadcastQ command, and provides the partial response in accordance with one embodiment. The process begins at block 1400 and then proceeds to block 1402, which illustrates an INT snooper 220 monitoring to detect receipt of an interrupt broadcastQ command, which is issued by an INT master 216 as discussed above with reference to block 740 of FIG. 7D.

In response to detection of an interrupt broadcastQ command, the INT snooper 220 determines at block 1404 whether or not its ICT 222 includes an entry matching the VP # criteria specified in VP # field 532 of the interrupt broadcastQ command. If not, the process simply ends at block 1408. If, however, INT snooper 220 detects a match at block 1404, INT snooper 220 provides a partial response with an aTAG ID of '01' and the poll vector set to indicate (e.g., with one bit) the snooper ID assigned to the INT snooper 220. Thereafter, the process of FIG. 14 ends at block 1408. Thus, in response to interrupt broadcastQ commands, INT snoopers 220 do not reserve resources or execute commands, but instead signal in the aTAGs of their partial responses their snooper IDs if they have a potential target VP matching the criteria specified in the interrupt broadcastQ command.

As with the other interrupt commands, response logic 404 combines the partial responses of the interrupt broadcastQ command to obtain a combined response 426. If the aTAG of the combined response of the broadcastQ operation has just a single bit set indicating all target VPs reside on one chip, INT master 216 records the identifier of that chip in association with the interrupt in target spread field 264 of the relevant END 261 in END table 260. Otherwise, INT master 216 determines the smallest scope of transmission of interrupt commands to include all possible target VPs for the interrupt and records that target scope in association with the interrupt in target scope field 262 of the relevant END 261 in END table 260. This scope information is then utilized to set an initial scope of subsequent interrupt histogram, interrupt poll, and interrupt assign commands for the interrupt, which may differ from the default group scope.

As has been described, in at least one embodiment, a data processing system includes a plurality of processor cores having a plurality of physical processor threads. A plurality of virtual processor threads are executed on the plurality of physical processor threads. In a data structure, information pertaining to a plurality of interrupt sources in the data processing system is maintained. The information includes a historical scope of transmission of interrupt commands for an interrupt source. Based on an interrupt request from an interrupt source, an interrupt master transmits a first interrupt bus command on an interconnect fabric of the data processing system to poll one or more interrupt snoopers regarding availability of one or more of the virtual processor threads to service an interrupt. The interrupt master updates the scope of transmission specified in the data structure based on a combined response to the first interrupt bus command. The interrupt master applies the scope of transmission specified in the data structure to a subsequent second interrupt bus command for the interrupt source.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructi ons.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof. The term "exemplary" means one example of a step or feature, not necessarily the best or only step or feature. As employed herein, a "storage device" is specifically defined to include only statutory articles of manufacture and to exclude signal media per se, transitory propagating signals per se, and energy per se.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method of data processing in a data processing system including a plurality of processor cores having a plurality of physical processor threads, the method comprising:
   executing a plurality of virtual processor threads on the plurality of physical processor threads;
   maintaining in a data structure information pertaining to a plurality of interrupt sources in the data processing system, the information including a historical scope of transmission of interrupt commands for an interrupt source among the plurality of interrupt sources;
   based on an interrupt request from an interrupt source among the plurality of interrupt sources, an interrupt master transmitting a first interrupt bus command on an interconnect fabric of the data processing system to poll one or more interrupt snoopers regarding availability of one or more of the virtual processor threads to service an interrupt;
   the interrupt master updating the scope of transmission specified in the data structure based on a combined response to the first interrupt bus command; and
   the interrupt master applying the updated scope of transmission specified in the data structure to a subsequent second interrupt bus command for the interrupt source, wherein the updated scope of transmission includes multiple of the plurality of processor cores.

2. The method of claim 1, wherein:
   the transmitting includes the interrupt master issuing the first interrupt bus command with a systemwide scope of transmission to discover virtual processor threads that may possibly service future interrupts from the interrupt source; and
   the step of updating the scope of transmission includes updating the scope of transmission to a narrower scope of transmission than said systemwide scope.

3. The method of claim 1, further comprising:
   the interrupt master, based on the combined response of the first interrupt bus command, issuing an interrupt broadcast query command of systemwide transmission scope to discover virtual processor threads that are capable of servicing future interrupts from the interrupt source and, based on a combined response of the interrupt broadcast query command, updating the scope of transmission specified in the data structure.

4. The method of claim 1, wherein:
   the information indicates that all virtual processors that can serve as targets for interrupts from the interrupt source are all located in a common location in the data processing system; and
   the first interrupt bus command targets only a single interrupt snooper among the one or more interrupt snoopers.

5. The method of claim 4, wherein the single interrupt snooper initiates processing the interrupt prior to receipt by the single interrupt snooper of a combined response to the first interrupt bus command.

6. The method of claim 4, wherein updating includes the interrupt master, based on the combined response, updating the scope of transmission in the data structure to a larger scope of transmission including a greater number of the plurality of processor cores.

7. The method of claim 1, wherein the historical scope of transmission is the minimum scope of transmission to reach all previously discovered virtual processing threads that can possibly, service the interrupt.

8. A data processing system, comprising:
   a plurality of processor cores having a plurality of physical processor threads, wherein the plurality of processor cores execute a plurality of virtual processor threads on the plurality of physical processor threads;
   an interconnect fabric; and
   an interrupt master communicatively coupled to the interconnect fabric and to a plurality of interrupt sources, wherein the interrupt master is configured to perform:
      maintaining in a data structure information pertaining to the plurality of interrupt sources, the information including a historical scope of transmission of interrupt commands for an interrupt source among the plurality of interrupt sources;
      based on an interrupt request from an interrupt source among the plurality of interrupt sources, transmitting a first interrupt bus command on an interconnect fabric of the data processing system to poll one or more interrupt snoopers regarding availability of one or more of the virtual processor threads to service an interrupt;
      updating the scope of transmission specified in the data structure based on a combined response to the first interrupt bus command; and
      applying the updated scope of transmission specified in the data structure to a subsequent second interrupt bus command for the interrupt source, wherein the updated scope of transmission includes multiple of the plurality of processor cores.

9. The data processing system of claim 8, wherein:
   the transmitting includes the interrupt master issuing the first interrupt bus command with a systemwide scope of transmission to discover virtual processor threads that may possibly service future interrupts from the interrupt source; and updating the scope of transmission includes updating the scope of transmission to a narrower scope of transmission than said systemwide scope.

10. The data processing system of claim 8, wherein the interrupt master is configured to perform:
based on the combined response of the first interrupt bus command, issuing an interrupt broadcast query command of systemwide transmission scope to discover virtual processor threads that are capable of servicing future interrupts from the interrupt source, and based on a combined response of the interrupt broadcast query command, updating the scope of transmission specified in the data structure.

11. The data processing system of claim 8, wherein:
the information indicates that all virtual processors that can serve as targets for interrupts from the interrupt source are all located in a common location in the data processing system; and
the first interrupt bus command targets only a single interrupt snooper among the one or more interrupt snoopers.

12. The data processing system of claim 11, wherein the single interrupt snooper initiates processing the interrupt prior to receipt by the single interrupt snooper of a combined response to the first interrupt bus command.

13. The data processing system of claim 1, wherein the updating includes:
based on the combined response, updating the scope of transmission in the data structure to a larger scope of transmission including a greater number of the plurality of processor cores.

14. The data processing system of claim 8, wherein the historical scope of transmission is the minimum scope of transmission to reach all previously discovered virtual processing threads that can possibly service the interrupt.

15. A program product, comprising:
a storage device;
program code stored on the storage device and executable by interrupt logic in a data processing system including a plurality of processor cores having a plurality of physical processor threads, wherein the plurality of processor cores execute a plurality of virtual processor threads on the plurality of physical processor threads, wherein the interrupt logic includes an interrupt master communicatively coupled to an interconnect fabric of the data processing system and to a plurality of interrupt sources and the program code causes the interrupt master to perform:
maintaining in a data structure information pertaining to the plurality of interrupt sources, the information including a historical scope of transmission of interrupt commands for an interrupt source among the plurality of interrupt sources;
based on an interrupt request from an interrupt source among the plurality of interrupt sources, transmitting a first interrupt bus command on an interconnect fabric of the data processing system to poll one or more interrupt snoopers regarding availability of one or more of the virtual processor threads to service an interrupt;
updating the scope of transmission specified in the data structure based on a combined response to the first interrupt bus command; and
applying the updated scope of transmission specified in the data structure to a subsequent second interrupt bus command for the interrupt source, wherein the updated scope of transmission includes multiple of the plurality of processor cores.

16. The program product of claim 15, wherein:
the transmitting includes the interrupt master issuing the first interrupt bus command with a systemwide scope of transmission to discover virtual processor threads that may possibly service future interrupts from the interrupt source; and
updating the scope of transmission includes updating the scope of transmission to a narrower scope of transmission than said systemwide scope.

17. The program product of claim 15, wherein the program code causes the interrupt master to perform:
based on the combined response of the first interrupt bus command, issuing an interrupt broadcast query command of systemwide transmission scope to discover virtual processor threads that are capable of servicing future interrupts from the interrupt source, and based on a combined response of the interrupt broadcast query command, updating the scope of transmission specified in the data structure.

18. The program product of claim 15, wherein:
the information indicates that all virtual processors that can serve as targets for interrupts from the interrupt source are all located in a common location in the data processing system; and
the first interrupt bus command targets only a single interrupt snooper among the one or more interrupt snoopers.

19. The program product of claim 18, wherein the single interrupt snooper initiates processing the interrupt prior to receipt by the single interrupt snooper of a combined response to the first interrupt bus command.

20. The program product of claim 18, wherein the updating includes:
based on the combined response, updating the scope of transmission in the data structure to a larger scope of transmission including a greater number of the plurality of processor cores.

* * * * *